United States Patent
Harikumar et al.

(10) Patent No.: US 12,493,937 B2
(45) Date of Patent: Dec. 9, 2025

(54) PRIOR GUIDED LATENT DIFFUSION

(71) Applicant: ADOBE INC., San Jose, CA (US)

(72) Inventors: Midhun Harikumar, Sunnyvale, CA (US); Venkata Naveen Kumar Yadav Marri, Newark, CA (US); Ajinkya Gorakhnath Kale, San Jose, CA (US); Pranav Vineet Aggarwal, Santa Clara, CA (US); Vinh Ngoc Khuc, Campbell, CA (US)

(73) Assignee: ADOBE INC., San Jose, CA (US)

( * ) Notice: Subject to any disclaimer, the term of this patent is extended or adjusted under 35 U.S.C. 154(b) by 299 days.

(21) Appl. No.: 18/301,671

(22) Filed: Apr. 17, 2023

(65) Prior Publication Data
US 2024/0346629 A1    Oct. 17, 2024

(51) Int. Cl.
| G06T 5/00 | (2024.01) |
| G06F 40/279 | (2020.01) |
| G06T 5/50 | (2006.01) |
| G06T 5/73 | (2024.01) |

(52) U.S. Cl.
CPC .............. *G06T 5/73* (2024.01); *G06F 40/279* (2020.01); *G06T 5/50* (2013.01)

(58) Field of Classification Search
CPC ... G06T 5/73; G06T 5/50; G06T 11/00; G06F 40/279
See application file for complete search history.

(56) References Cited

U.S. PATENT DOCUMENTS

| 10,713,821 | B1 | 7/2020 | Surya et al. |
| 11,216,505 | B2 | 1/2022 | Motiian et al. |
| 11,922,550 | B1 | 3/2024 | Ramesh et al. |
| 11,995,803 | B1 | 5/2024 | Karpman et al. |
| 2011/0069325 | A1 | 3/2011 | Kawashima et al. |
| 2022/0343561 | A1 | 10/2022 | Aggarwal et al. |
| 2023/0118966 | A1 | 4/2023 | Liu et al. |
| 2024/0112088 | A1 | 4/2024 | Yu et al. |
| 2024/0153152 | A1 | 5/2024 | Liu et al. |
| 2024/0185035 | A1 | 6/2024 | Yu et al. |
| 2024/0282131 | A1* | 8/2024 | Ren ................... G06V 10/7753 |
| 2024/0303764 | A1 | 9/2024 | Pang et al. |
| 2024/0331235 | A1* | 10/2024 | Smock ................... G16C 20/70 |

OTHER PUBLICATIONS

Aditya Ramesh et al., "Hierarchical Text-Conditional Image Generation with CLIP Latents", pub. Apr. 13, 2022 (Year: 2022).*

(Continued)

*Primary Examiner* — Mekonen T Bekele
(74) *Attorney, Agent, or Firm* — F. CHAU & ASSOCIATES, LLC

(57) ABSTRACT

Systems and methods for image processing are described. Embodiments of the present disclosure obtain a text prompt for text guided image generation. A multi-modal encoder of an image processing apparatus encodes the text prompt to obtain a text embedding. A diffusion prior model of the image processing apparatus converts the text embedding to an image embedding. A latent diffusion model of the image processing apparatus generates an image based on the image embedding, wherein the image includes an element described by the text prompt.

20 Claims, 18 Drawing Sheets

(56) References Cited

OTHER PUBLICATIONS

1 Li, et al., "Universal Style Transfer via Feature Transforms", 31st Conference on Neural Information Processing Systems (NIPS 2017), 11 pages.
2 Radford, et al., "Learning Transferable Visual Models From Natural Language Supervision", In International Conference on Machine Learning (pp. 8748-8763), PMLR, arXiv preprint: arXiv:2103.00020v1 [cs.CV] Feb. 26, 2021.
3 Rramesh, et al., "Hierarchical Text-Conditional Image Generation with CLIP Latents", arXiv preprint: arXiv:2204.06125v1 [cs.CV] Apr. 13, 2022, 27 pages.
4 Rombach, et al., "High-Resolution Image Synthesis with Latent Diffusion Models", In Proceedings of the IEEE/CVF Conference on Computer Vision and Pattern Recognition (pp. 10684-10695), arXiv preprint: arXiv:2112.10752v2 [cs. CV] Apr. 13, 2022.
5 Saharia, et al., "Photorealistic Text-to-Image Diffusion Models with Deep Language Understanding", arXiv preprint: arXiv:2205.11487v1 [cs.CV] May 23, 2022, 46 pages.
7 Align: Scaling Up Visual and Vision-Language Representation Learning With Noisy Text Supervision. Tuesday, May 11, 2021. Posted by Chao Jia and Yinfei Yang, Software Engineers, Google Research. Found on the internet at: https://ai.googleblog.com/2021/05/align-scaling-up-visual-and-vision.html.
8 GitHub—FreddeFrallan/Multilingual-CLIP: OpenAI CLIP text encoders for multiple languages, 7 pages. Found on the internet, https://github.com/FreddeFrallan/Multilingual-CLIP#readme.
Office Action dated Apr. 29, 2025 in related U.S. Appl. No. 18/329,111.
Office Action dated Jun. 3, 2025 in related U.S. Appl. No. 18/296,002.
Office Action dated Aug. 14, 2025 in related U.S. Appl. No. 18/296,002.
Office Action dated Sep. 18, 2025 in related U.S. Appl. No. 18/319,111.

* cited by examiner

US 12,493,937 B2

PRIOR GUIDED LATENT DIFFUSION

BACKGROUND

The following relates generally to machine learning, and more specifically to machine learning for image generation. Digital image processing refers to the use of a computing device to edit a digital image using an algorithm or a processing network. In some cases, image processing software can be used for various image processing tasks, such as image editing, image restoration, image generation, etc. Some image processing systems may implement machine learning techniques, for example, to perform tasks using predictive models (e.g., without explicitly programming the system for each task), to perform tasks with more accuracy or in less time, to perform tasks using special-purpose hardware, etc.

Machine learning models are used in image generation such as generative deep learning models. However, conventional models involve high computational burden and memory usage and do not provide enough flexibility. Therefore, there is a need in the art for an improved image processing system that is optimized in terms of training efficiency and memory usage.

SUMMARY

The present disclosure describes systems and methods for image processing. Embodiments of the present disclosure include an image processing apparatus configured to generate an output image using an optimized image generation network. The image processing apparatus is configured for image generation using a combination of a diffusion prior model and a latent diffusion model. The latent diffusion model is trained to generate images from an image embedding of the image (e.g., CLIP image embedding), whereas the diffusion prior model can map multiple modalities (e.g., text embedding) to an image embedding. For example, in text to image generation context, the diffusion prior model is trained to map CLIP text embedding to CLIP image embedding. Some embodiments of the present disclosure can also handle image to image variations generation, by maintaining the semantics of a target image but varying the structure in image variations.

A method, apparatus, and non-transitory computer readable medium for image processing are described. One or more embodiments of the method, apparatus, and non-transitory computer readable medium include obtaining a text prompt; encoding the text prompt to obtain a text embedding; converting the text embedding to an image embedding using a diffusion prior model; and generating an image based on the image embedding using a latent diffusion model (LDM), wherein the image includes an element described by the text prompt.

A method, apparatus, and non-transitory computer readable medium for image processing are described. One or more embodiments of the method, apparatus, and non-transitory computer readable medium include obtaining training data including a training image; encoding the training image to obtain an image embedding using a multi-modal encoder; initializing a latent diffusion model; and training the LDM to generate an image based on the image embedding.

An apparatus and method for image processing are described. One or more embodiments of the apparatus and method include at least one processor; at least one memory including instructions executable by the at least one processor to perform operations including; encoding, using a multi-modal encoder, a text prompt to obtain a text embedding; converting, using a diffusion prior model, the text embedding to an image embedding; and generating, using a latent diffusion model, an image based on the image embedding, wherein the image includes an element described by the text prompt.

DETAILED DESCRIPTION

Figure 1:
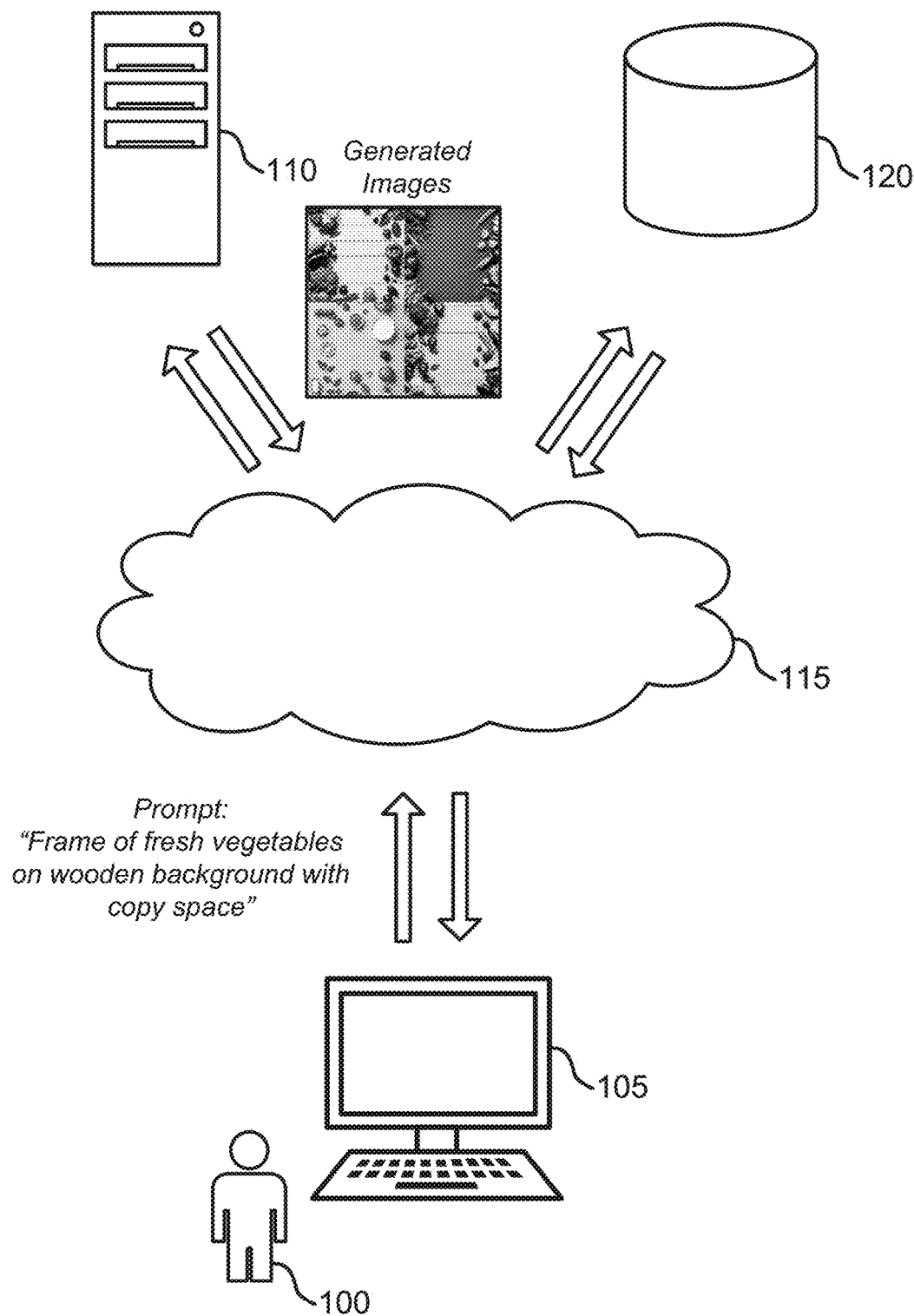
FIG. 1 shows an example of an image processing system according to aspects of the present disclosure.

The present disclosure describes systems and methods for image processing. Embodiments of the present disclosure include an image processing apparatus configured to generate an output image using an optimized image generation network. The image processing apparatus is configured for image generation using a combination of a diffusion prior model and a latent diffusion model. The latent diffusion model is trained to generate images from an image embedding of the image (e.g., CLIP image embedding), whereas the diffusion prior model can map multiple modalities (e.g., text embedding) to an image embedding. For example, in text to image generation context, the diffusion prior model is trained to map CLIP text embedding to CLIP image embedding. Some embodiments of the present disclosure can also handle image to image variations generation, by maintaining the semantics of a target image but varying the structure in image variations.

Recently, image processing models are used in tasks such as image enhancement, restoration, completion, or compression. Image generative models can generate an output image based on text or an original image. Diffusion models are a class of generative neural networks that can be trained to generate new data with features similar to features found in training data. Diffusion models can be used in image generation tasks, such as converting text-based embedding to realistic images. However, diffusion models are limited to scenarios where the diffusion models rely on generating images in pixel space or rely on text information as a condition for image generation tasks (e.g., cannot properly handle image-to-image generation). Additionally, conventional models depend on a large amount of training data and require costly computation resources to retrain or fine-tune the diffusion model.

Embodiments of the present disclosure include an image processing apparatus configured to generate an image based on a text prompt. The image processing apparatus is configured for text to image generation using a combination of a diffusion prior model and a latent diffusion model. The latent diffusion model is trained to generate images from CLIP image embedding of the image, whereas the diffusion prior model can map multiple modalities (e.g., text embedding of text prompt) to image embedding. In text to image generation context, the diffusion prior model is trained to map CLIP text embedding to CLIP image embedding. Some embodiments of the present disclosure can also handle image to image variations generation, by keeping the semantics of the image constant but varying the structure. CLIP (Contrastive Language-Image Pre-Training) model is a neural network trained on a variety of (image, text) pairs.

In some embodiments, the image processing apparatus encodes a text prompt to obtain a text embedding. A diffusion prior model converts the text embedding to an image embedding. A latent diffusion model generates an image based on the image embedding, where the image includes an element described by the text prompt. A target image is input to a multi-modal encoder (e.g., CLIP encoder) to obtain an additional image embedding. The latent diffusion model generates one or more additional images based on the additional image embedding, where the one or more additional images include an additional element of the target image. Accordingly, the image processing apparatus can handle tasks such as text-to-image generation and image-to-image-variation generation. For example, in image-to-image variation generations, the image processing apparatus can output consistent image variations based on a target image.

In some embodiments, the diffusion prior model converts a text embedding to an image embedding. The diffusion prior model generates an image embedding based on the text embedding. During inference, the diffusion prior model passes one image embedding to the diffusion model to generate an image. In some examples, the diffusion prior model generates one hundred image embeddings. The one image embedding is selected out of the one hundred image embeddings using a similarity score between generated image embedding and the text embedding (e.g., multilingual CLIP similarity score). The selected image embedding is input to the latent diffusion model to generate an image. To generate the one hundred image embeddings, the diffusion prior model is configured to sample each embedding using different noise values during the diffusion process such that the one hundred image embeddings go through the entire diffusion process.

At training, the diffusion prior model passes a single image embedding to the latent diffusion model for image generation, i.e., the diffusion model uses the same image embedding context at all time steps to generate an image. At each time step of the diffusion prior model, the diffusion prior model uses noised CLIP image embedding along with a time step information to predict a less noised CLIP image embedding. This process continues for N timesteps until a refined less noisy CLIP image embedding is generated. For example, this process is repeated one hundred times to predict one hundred different CLIP image embeddings, out of which one CLIP image embedding is selected based on cosine similarity between a predicted image embedding versus a text embedding corresponding a text prompt. The text embedding is used as guidance on how to remove the noise.

Accordingly, by combining the diffusion prior model and the latent diffusion model, embodiments of the present disclosure enable better control and increase image generation quality on text-to-image generation and image-to-image variation generation. The latent diffusion model is trained to generate images from CLIP image embedding of the image, whereas the diffusion prior is a flexible module (and cheaper to train) which can be used to map multiple modalities to an image embedding. The variety and diversity of the generated images are increased without the need to modify a text prompt on the user's end. Embodiments of the present disclosure generate multiple different images based on a text prompt. For example, in text to image generation, the diffusion prior model is trained to map a CLIP text embedding of a text prompt to one or more CLIP image embeddings. This way, embodiments of the present disclosure can re-use the pre-trained latent diffusion model without having to re-train the model so as to save memory and reduce computation burden.

Embodiments of the present disclosure can be used in the context of image generation applications. For example, an image processing apparatus based on the present disclosure receives a text prompt from a user and generates one or more images based on the text prompt. The user may further select a target image from the generated images and run the image-to-image variation generation to generate similar images. An example application in the image generation processing context is provided with reference to FIGS. 7-10. Details regarding the architecture of an example of image processing system are provided with reference to FIGS. 1-6 and 18. Details regarding the process of the image processing are provided with reference to FIGS. 7-12. Examples of training processes are described with reference to FIGS. 13-17.

In some examples, embedding(s) refers to a low-dimensional space which a high-dimensional vector can be converted from. For example, an embedding or an embedding space captures the semantics of an input by grouping semantically similar inputs close together in the embedding space. In some cases, each individual word in a text prompt is represented as a real-valued vector in a lower-dimensional space such that the lower-dimensional space can capture inter-word semantics.

Network Architecture

In FIGS. 1-6 and 18, an apparatus and method for image processing are described. One or more embodiments of the apparatus and method include at least one processor; and at least one memory including instructions executable by the at least one processor to perform operations including: encoding, using a multi-modal encoder, a text prompt to obtain a text embedding; converting, using a diffusion prior model, the text embedding to an image embedding; and generating, using a latent diffusion model (LDM), an image based on the image embedding, wherein the image includes an element described by the text prompt.

In some examples, the diffusion prior model comprises a transformer architecture. In some examples, the LDM comprises a U-Net architecture. In some examples, the LDM comprises an image decoder. Some examples of the apparatus and method further include a training component configured to train the LDM.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIGS. 2, 9, and 10.

Referring to FIG. 1, user 100 provides a text prompt to image processing apparatus 110, e.g., via user device 105 and cloud 115. The text prompt says, "frame of fresh vegetables on wooden background with copy space." In some cases, the text prompt can be a word, a short phrase, or a paragraph including multiple phrases. In text to image generation context, a diffusion prior model of image processing apparatus 110 is trained to map a text embedding (e.g., CLIP text embedding) to an image embedding (e.g., CLIP image embedding).

Image processing apparatus 110 displays the generated images based on the text prompt to user 100 via cloud 115 and/or user device 105. The generated images may display one or more elements described by the text prompt. In some cases, user 100 may input other types of conditions such that the diffusion prior model is conditioned on one or more of these conditions (e.g., condition on color, style, and sketch of an image). At training, the diffusion prior model is trained to map different modalities (in this example, text modality) to the image embedding. A latent diffusion model of image processing apparatus 110 is trained to generate an image from a CLIP image embedding.

In some cases, the generated images depict or include one or more elements described by the text prompt. In the above example, the generated images include various types of vegetables having a wooden or wooden-looking background. With regards to the generated images, the vegetables are positioned with some space in the middle part of an image. The generated images show variations and have different vegetables (i.e., different objects of the same class). The generated images may not have similar compositions.

In some examples, user 100 views the generated images and wants to generate diverse variations of a target image, by maintaining the semantics of the image, expressing the fine-grained changes as part of a text prompt can be difficult. Accordingly, image processing apparatus 110 is configured to generate similar variations of images (e.g., a target image selected by user 100 who wants to see more image variations). Image processing apparatus 110 can generate as many variations as user 100 wants.

User device 105 may be a personal computer, laptop computer, mainframe computer, palmtop computer, personal assistant, mobile device, or any other suitable processing apparatus. In some examples, user device 105 includes software that incorporates an image processing application.

In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to user device 105 and rendered locally by a browser.

According to some embodiments of the present disclosure, image processing apparatus 110 encodes the text prompt to obtain a text embedding of the text prompt. In some cases, image processing apparatus 110 encodes a multi-modal prompt to obtain a multi-modal embedding. Image processing apparatus 110 converts the multi-modal embedding (e.g., a text embedding) to one or more image embeddings using a diffusion prior model. Image processing apparatus 110 generates one or more images based on the one or more image embeddings using a latent diffusion model. Further detail regarding the diffusion prior model is provided with reference to FIGS. 2, 5-6, and 17. Further detail regarding the latent diffusion model is provided with reference to FIGS. 2-5 and 17.

Figure 2:
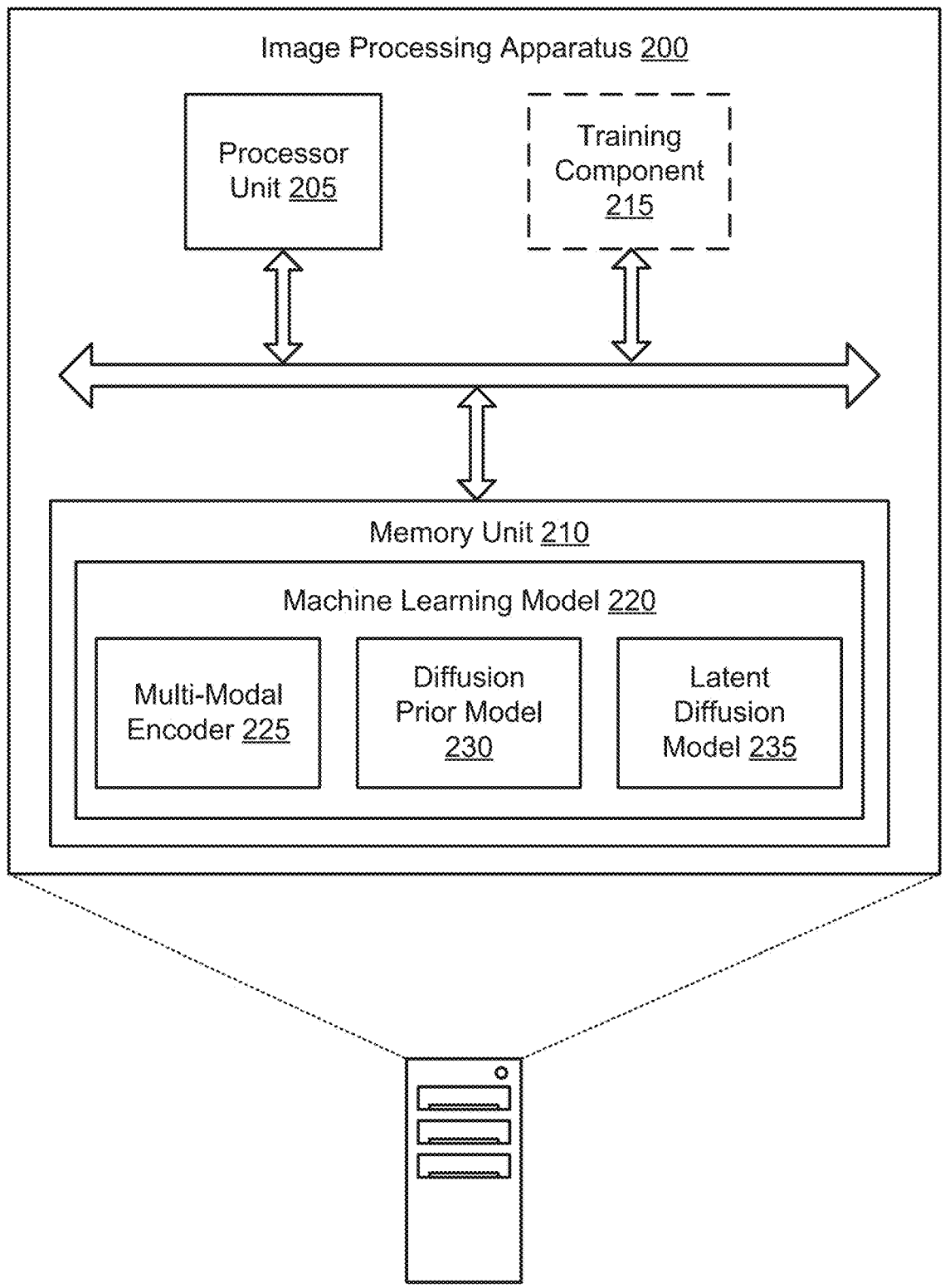
FIG. 2 shows an example of an image processing apparatus according to aspects of the present disclosure.

Image processing apparatus 110 includes a computer implemented network comprising a machine learning model (e.g., machine learning model 220 in FIG. 2). The machine learning model includes a multi-modal encoder, a diffusion model, and a latent diffusion model. Image processing apparatus 110 also includes a processor unit, a memory unit, and a training component. Additionally, image processing apparatus 110 communicates with database 120 via cloud 115. In some cases, the architecture of the image processing network is also referred to as a network or a network model. Further detail regarding the architecture of image processing apparatus 110 is provided with reference to FIGS. 2 and 5-6. Further detail regarding the application and operation of image processing apparatus 110 is provided with reference to FIGS. 7-12.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by user 100. The term "cloud" is sometimes used to describe data centers available to many users (e.g., user 100) over the Internet. Some large cloud networks have functions distributed over multiple locations from central servers. A server is designated an edge server if the server has a direct or close connection to a user (e.g., user 100). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some embodiments, cloud 115 enables communication between user device 105, image processing apparatus 110, and database 120.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, user 100 interacts with database controller. In other cases, database controller may operate automatically without user interaction. According to some embodiments, database 120 is external to image processing apparatus 110 and communicates with image processing apparatus 110 via cloud 115. According to some embodiments, database 120 is included in image processing apparatus 110.

FIG. 2 shows an example of an image processing apparatus 200 according to aspects of the present disclosure. The example shown includes image processing apparatus 200, processor unit 205, memory unit 210, training component 215, and machine learning model 220. In an embodiment, machine learning model 220 includes multi-modal encoder 225, diffusion prior model 230, and latent diffusion model 235. Image processing apparatus 200 is an example of, or includes aspects of, the corresponding element described with reference to FIGS. 1, 9, and 10.

Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special-purpose components for modem processing, baseband processing, digital signal processing, or transmission processing. processor unit 205 is an example of, or includes aspects of, the processor described with reference to FIG. 18.

In an embodiment, memory unit 210 includes or stores trainable parameters of machine learning model 220. Memory unit 210 includes instructions executable by a processor unit to perform certain functions of machine learning model 220.

Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state. Memory unit 210 is an example of, or includes aspects of, the memory subsystem described with reference to FIG. 18.

According to some embodiments of the present disclosure, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge are associated with one or more node weights that determine how the signal is processed and transmitted.

According to some embodiments, image processing apparatus 200 includes a computer-implemented convolutional neural network (CNN). CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that the filters activate when the filters detect a particular feature within the input.

According to some embodiments, training component 215 obtains training data including a training image. Training component 215 initializes latent diffusion model 235. Training component 215 trains latent diffusion model 235 to generate an image based on the image embedding. In some examples, training component 215 obtains additional training data including an additional image and a text describing the additional image. In some examples, training component 215 compares the set of predicted image embeddings to the text embedding. In some examples, training component 215 selects the predicted image embedding from the set of predicted image embeddings based on the comparison. In some examples, the image embedding is based on the predicted image embedding.

According to some embodiments, training component 215 is implemented as software stored in memory and executable by a processor of the separate computing device, as firmware in the separate computing device, as one or more hardware circuits of the separate computing device, or as a combination thereof. In some examples, training component 215 is part of another apparatus other than image processing apparatus 200 and communicates with image processing apparatus 200.

According to some embodiments, machine learning model 220 obtains a text prompt. In some examples, machine learning model 220 compares each of the set of image embeddings to the text embedding. In some examples, machine learning model 220 computes a similarity score based on the comparison, where the image embedding is selected based on the similarity score. In some examples, machine learning model 220 obtains an image prompt.

According to some embodiments, multi-modal encoder 225 encodes the text prompt to obtain a text embedding. In some aspects, the image embedding is in a same embedding space as the text embedding. In some examples, multi-modal encoder 225 encodes the image prompt to obtain an additional image embedding.

According to some embodiments, multi-modal encoder 225 encodes the training image to obtain an image embedding. In some examples, multi-modal encoder 225 encodes the additional image and the text to obtain an additional image embedding and a text embedding respectively. According to some embodiments, multi-modal encoder 225 encodes a text prompt to obtain a text embedding. Multi-modal encoder 225 is an example of, or includes aspects of, the corresponding element described with reference to FIGS. 5, 6, and 17.

According to some embodiments, diffusion prior model 230 converts the text embedding to an image embedding. In some examples, diffusion prior model 230 generates a set of image embeddings based on the text embedding, where the image embedding is selected from the set of image embeddings.

According to some embodiments, diffusion prior model 230 generates a predicted image embedding based on the additional image embedding. In some examples, diffusion prior model 230 generates a set of predicted image embeddings based on the set of additional noise image embeddings.

According to some embodiments, diffusion prior model 230 converts the text embedding to an image embedding. In some examples, the diffusion prior model 230 includes a transformer architecture. Diffusion prior model 230 is an example of, or includes aspects of, the corresponding element described with reference to FIGS. 5, 6, and 17.

According to some embodiments, latent diffusion model 235 generates an image based on the image embedding, where the image includes an element described by the text prompt. In some examples, latent diffusion model 235 generates a set of images based on the set of image embeddings, respectively, where each of the set of images includes the element described by the text prompt. In some examples, latent diffusion model 235 generates a set of images based on the image embedding, where each of the set of images includes the element described by the text prompt. In some examples, latent diffusion model 235 generates a set of noise maps, where each of the set of images is generated based on one of the set of noise maps. In some examples, the set of images have different aspect ratios. In some examples, latent diffusion model 235 generates a modified image embedding, where the image is generated based on the modified image embedding. In some examples, latent diffusion model 235 generates an additional image based on the additional image embedding, where the additional image includes an additional element of the image prompt.

According to some embodiments, latent diffusion model 235 adds noise to the image embedding to obtain a noise map. Latent diffusion model 235 computes predicted noise based on the noise map. Latent diffusion model 235 removes the predicted noise to obtain the image. In some examples, latent diffusion model 235 adds a corresponding noise from a set of noise to the additional image embedding to obtain a set of additional noise image embeddings.

According to some embodiments, latent diffusion model 235 generates an image based on the image embedding, wherein the image includes an element described by the text prompt. In some examples, latent diffusion model 235 includes a U-Net architecture. In some examples, latent diffusion model 235 includes an image decoder. Latent diffusion model 235 is an example of, or includes aspects of, the corresponding element described with reference to FIGS. 5 and 17.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
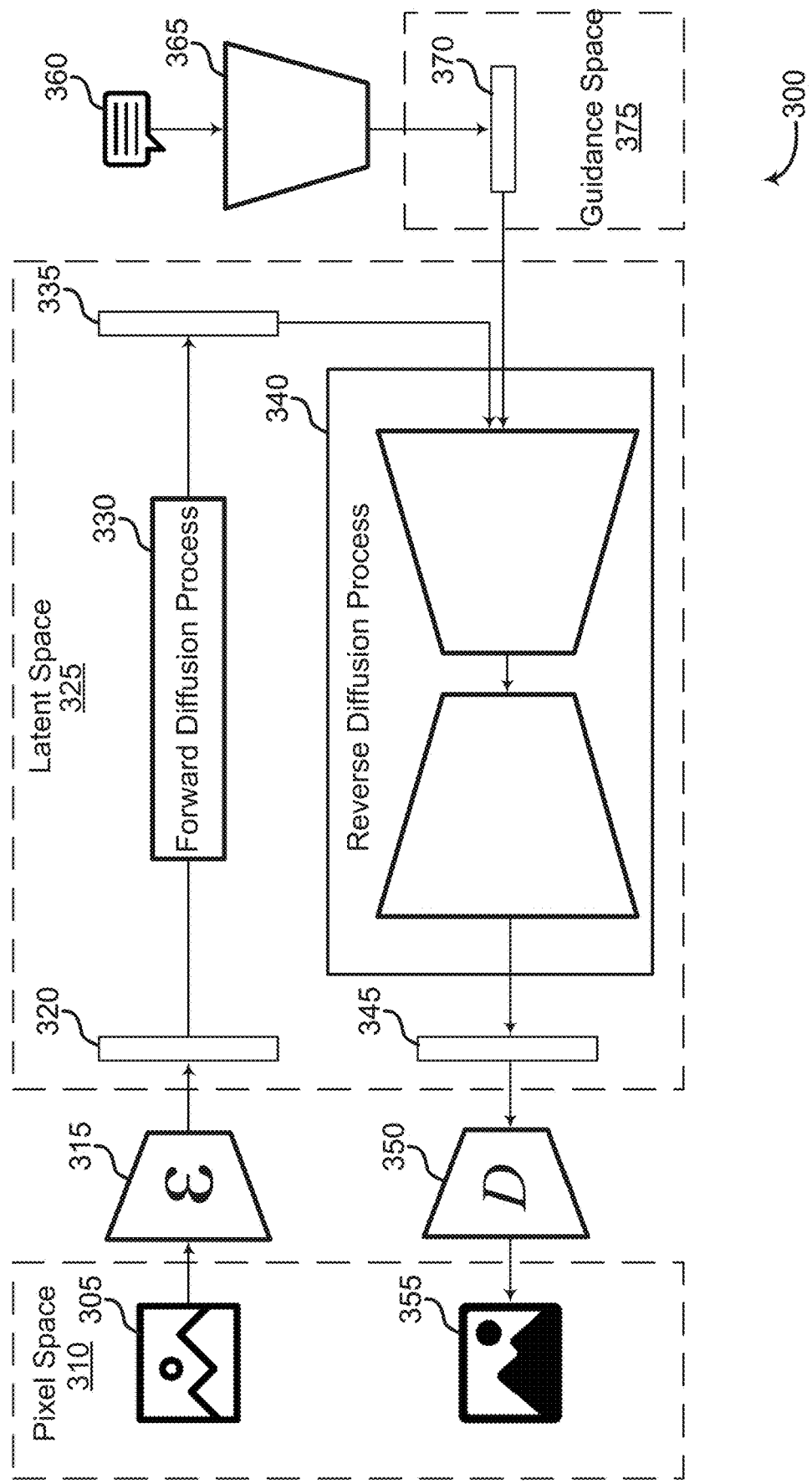
FIG. 3 shows an example of a latent diffusion model according to aspects of the present disclosure.

FIG. 3 shows an example of a latent diffusion model according to aspects of the present disclosure. The example shown includes guided latent diffusion model 300, original image 305, pixel space 310, image encoder 315, original image features 320, latent space 325, forward diffusion process 330, noisy features 335, reverse diffusion process 340, denoised image features 345, image decoder 350, output image 355, text prompt 360, text encoder 365, guidance features 370, and guidance space 375. Guided latent diffusion model 300 is an example of, or includes aspects of, the latent diffusion model described with reference to FIGS. 2, 5, and 17.

Latent diffusion models work by iteratively adding noise to the data during a forward process and then learning to recover the data by denoising the data during a reverse process. For example, during training, guided latent diffusion model 300 may take an original image 305 in a pixel space 310 as input and apply image encoder 315 to convert original image 305 into original image features 320 in a latent space 325. Then, a forward diffusion process 330 gradually adds noise to the original image features 320 to obtain noisy features 335 (also in latent space 325) at various noise levels.

Next, a reverse diffusion process 340 (e.g., a U-Net ANN) gradually removes the noise from the noisy features 335 at the various noise levels to obtain denoised image features 345 in latent space 325. In some examples, the denoised image features 345 are compared to the original image features 320 at each of the various noise levels, and parameters of the reverse diffusion process 340 of the diffusion model are updated based on the comparison. Finally, an image decoder 350 decodes the denoised image features 345 to obtain an output image 355 in pixel space 310. In some cases, an output image 355 is created at each of the various noise levels. The output image 355 can be compared to the original image 305 to train the reverse diffusion process 340.

In some cases, image encoder 315 and image decoder 350 are pre-trained prior to training the reverse diffusion process 340. In some examples, image encoder 315 and image decoder 350 are trained jointly, or the image encoder 315 and image decoder 350 and fine-tuned jointly with the reverse diffusion process 340.

The reverse diffusion process 340 can also be guided based on a text prompt 360, or another guidance prompt, such as an image, a layout, a segmentation map, etc. The text prompt 360 can be encoded using a text encoder 365 (e.g., a multi-modal encoder) to obtain guidance features 370 in guidance space 375. The guidance features 370 can be combined with the noisy features 335 at one or more layers of the reverse diffusion process 340 to ensure that the output image 355 includes content described by the text prompt 360. For example, guidance features 370 can be combined with the noisy features 335 using a cross-attention block within the reverse diffusion process 340 in latent space 325.

Text prompt 360 is an example of, or includes aspects of, the corresponding element described with reference to FIGS. 5, 8, and 9. Text encoder 365 is an example of, or includes aspects of, the multi-modal encoder described with reference to FIGS. 2, 5-6, and 17.

Figure 4:
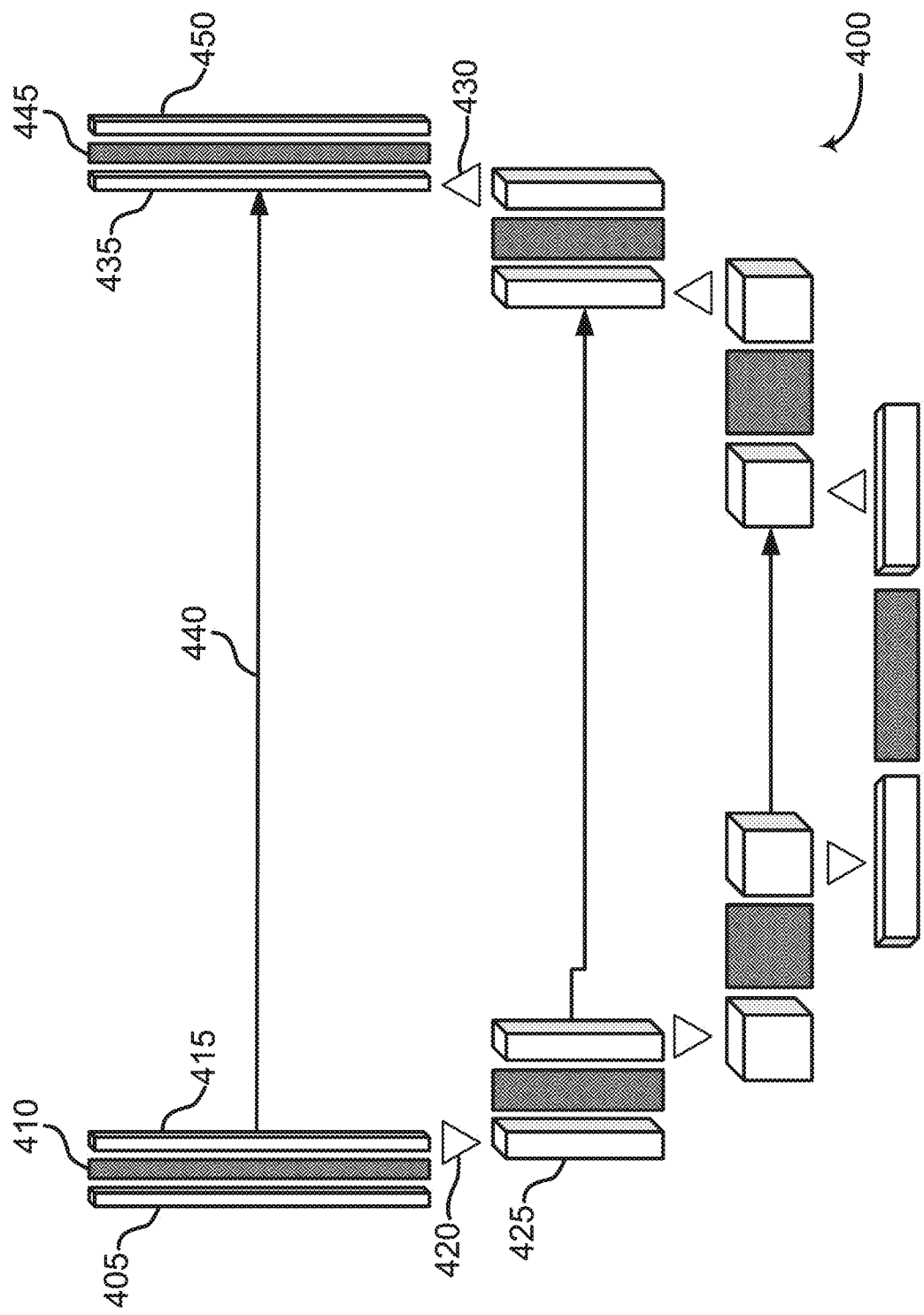
FIG. 4 shows an example of a U-Net architecture according to aspects of the present disclosure.

FIG. 4 shows an example of a U-Net 400 architecture according to aspects of the present disclosure. The example shown includes U-Net 400, input features 405, initial neural network layer 410, intermediate features 415, down-sampling layer 420, down-sampled features 425, up-sampling process 430, up-sampled features 435, skip connection 440, final neural network layer 445, and output features 450.

In some examples, diffusion models are based on a neural network architecture known as a U-Net 400. The U-Net 400 takes input features 405 having an initial resolution and an initial number of channels, and processes the input features 405 using an initial neural network layer 410 (e.g., a convolutional network layer) to produce intermediate features 415. The intermediate features 415 are then down-sampled using a down-sampling layer 420 such that down-sampled features 425 features have a resolution less than the initial resolution and a number of channels greater than the initial number of channels.

This process is repeated multiple times, and then the process is reversed. For example, the down-sampled features 425 are up-sampled using up-sampling process 430 to obtain up-sampled features 435. The up-sampled features 435 can be combined with intermediate features 415 having a same resolution and number of channels via a skip connection 440. These inputs are processed using a final neural network layer 445 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

The U-Net 400 depicted in FIG. 4 is an example of, or includes aspects of, the architecture used within the reverse diffusion process described with reference to FIG. 3. U-Net 400 is an example of, or includes aspects of, the corresponding element described with reference to FIG. 17.

Figure 5:
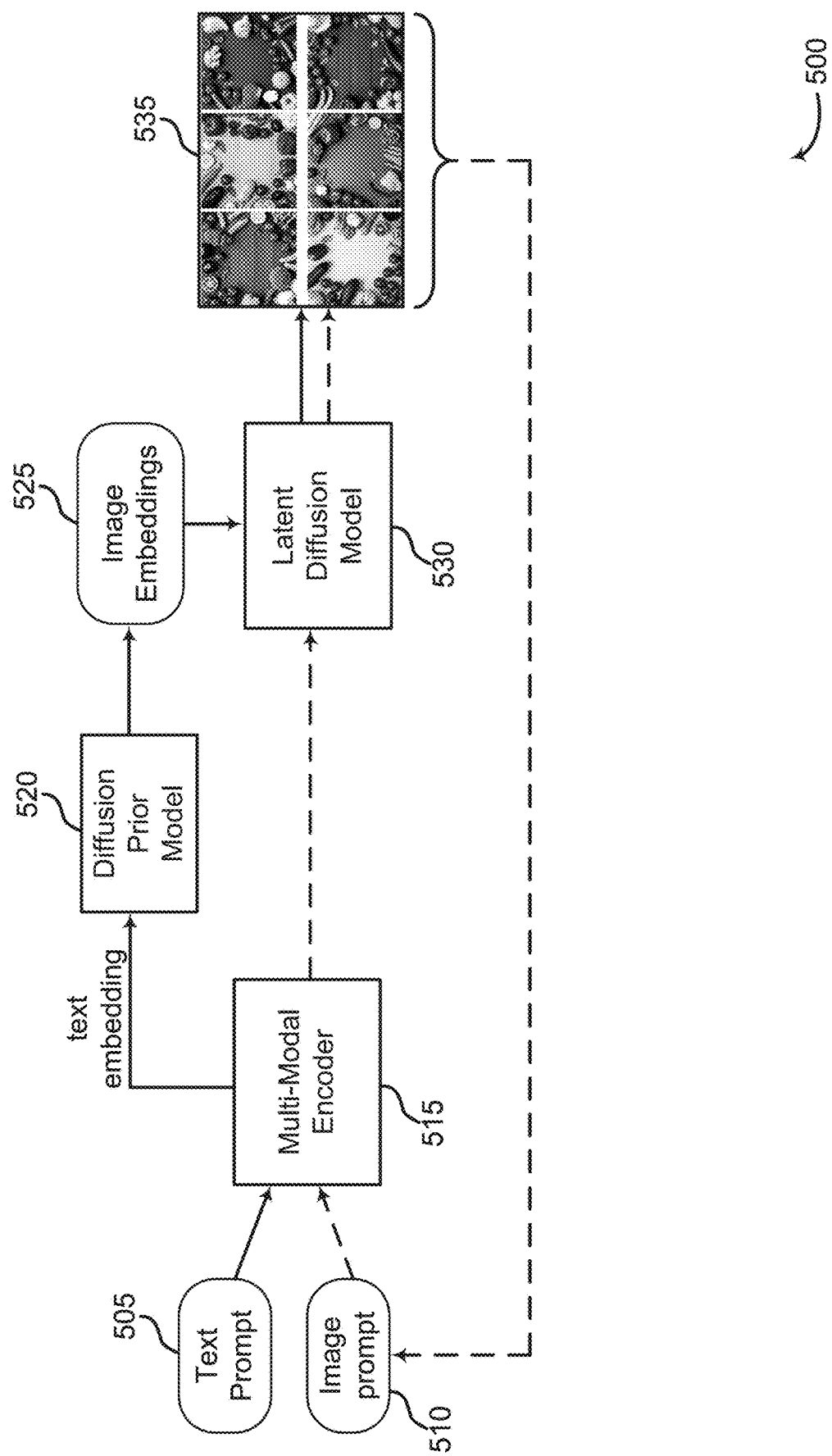
FIG. 5 shows an example of a machine learning model according to aspects of the present disclosure.

FIG. 5 shows an example of a machine learning model according to aspects of the present disclosure. The example shown includes machine learning model 500, text prompt 505, image prompt 510, multi-modal encoder 515, diffusion prior model 520, image embeddings 525, latent diffusion model 530, and generated images 535. According to an embodiment, machine learning model 500 includes multi-modal encoder 515, diffusion prior model 520, and latent diffusion model 530.

Referring to FIG. 5, machine learning model 500 can process text-to-image generation and image-to-image variation generation (two pathways). Machine learning model 500 is configured for text-to-image generation (represented by solid arrows) and image-to-image variation generation (represented by dashed arrows). For example, in the first stage, multi-modal encoder 515 takes a text (e.g., text prompt 505) as input and machine learning model 500 generates images (e.g., generated images 535) based on the text. In the second stage, machine learning model 500 takes one of the generated images 535 as input and generates additional images based on the image prompt 510.

As for text-to-image generation, text prompt 505 is input to multi-modal encoder 515. Text prompt 505 is an example of, or includes aspects of, the corresponding element described with reference to FIGS. 3, 8, and 9. In some cases, other types of prompts (e.g., style prompt, color prompt, and sketch prompt) are input to multi-modal encoder 515 to guide the image generation process. Multi-modal encoder 515 encodes the text prompt 505 to obtain a text embedding. Diffusion prior model 520 receives the text embedding and generates image embeddings 525. In some examples, diffusion prior model 520 generates one hundred image embeddings 525. Diffusion prior model 520 scores the one hundred image embeddings 525 using a similarity metric by comparing image embeddings 525 to the text embedding. In some cases, one image embedding is selected. In an embodiment, diffusion prior model 520 calculates a similarity score and selects an image embedding from image embeddings 525 with the highest similarity score with respect to the text embedding, where a high similarity score represents an image embedding that is similar to the text embedding.

According to some embodiments, text embedding and image embeddings 525 are in the same embedding space (i.e., in a multi-modal embedding space). The text embedding is in a first region of the multi-modal embedding space corresponding to text and the image embedding is in a second region of the multi-modal embedding space corresponding to images. Further detail regarding diffusion prior model 520 is provided with reference to FIG. 6.

Latent diffusion model 530 receives image embeddings 525 from diffusion prior model 520 and outputs generated images 535. Generated images 535 include one or more elements described by text prompt 505. For example, generated images 535 may be different in terms of composition, color, style, and aspect ratio from each other. Generated images 535 is an example of, or includes aspects of, the corresponding element described with reference to FIGS. 8 and 9.

As for image-to-image variation generation, a generated image (or a target image) of generated images 535 is selected as image prompt 510. Multi-modal encoder 515 encodes the image prompt 510 to generate a multi-modal embedding (e.g., a CLIP embedding). For example, the multi-modal embedding is an image embedding. The image embedding and input noise are input to latent diffusion model 530. In some cases, input noise (or noise values) alters features of an output image generated by latent diffusion model 530. Latent diffusion model 530 generates additional images based on image prompt 510. Image prompt 510 is an example of, or includes aspects of, the corresponding element described with reference to FIG. 10. For example, additional images include one or more elements (e.g., composition, color, style, aspect ratio, and metadata) of image prompt 510.

Multi-modal encoder 515 is an example of, or includes aspects of, the corresponding element described with reference to FIGS. 2, 6, and 17. Diffusion prior model 520 is an example of, or includes aspects of, the corresponding element described with reference to FIGS. 2, 6, and 17. Image embeddings 525 are an example of, or includes aspect of, the corresponding element described with reference to FIG. 6. Latent diffusion model 530 is an example of, or includes aspects of, the corresponding element described with reference to FIGS. 2 and 17.

Figure 6:
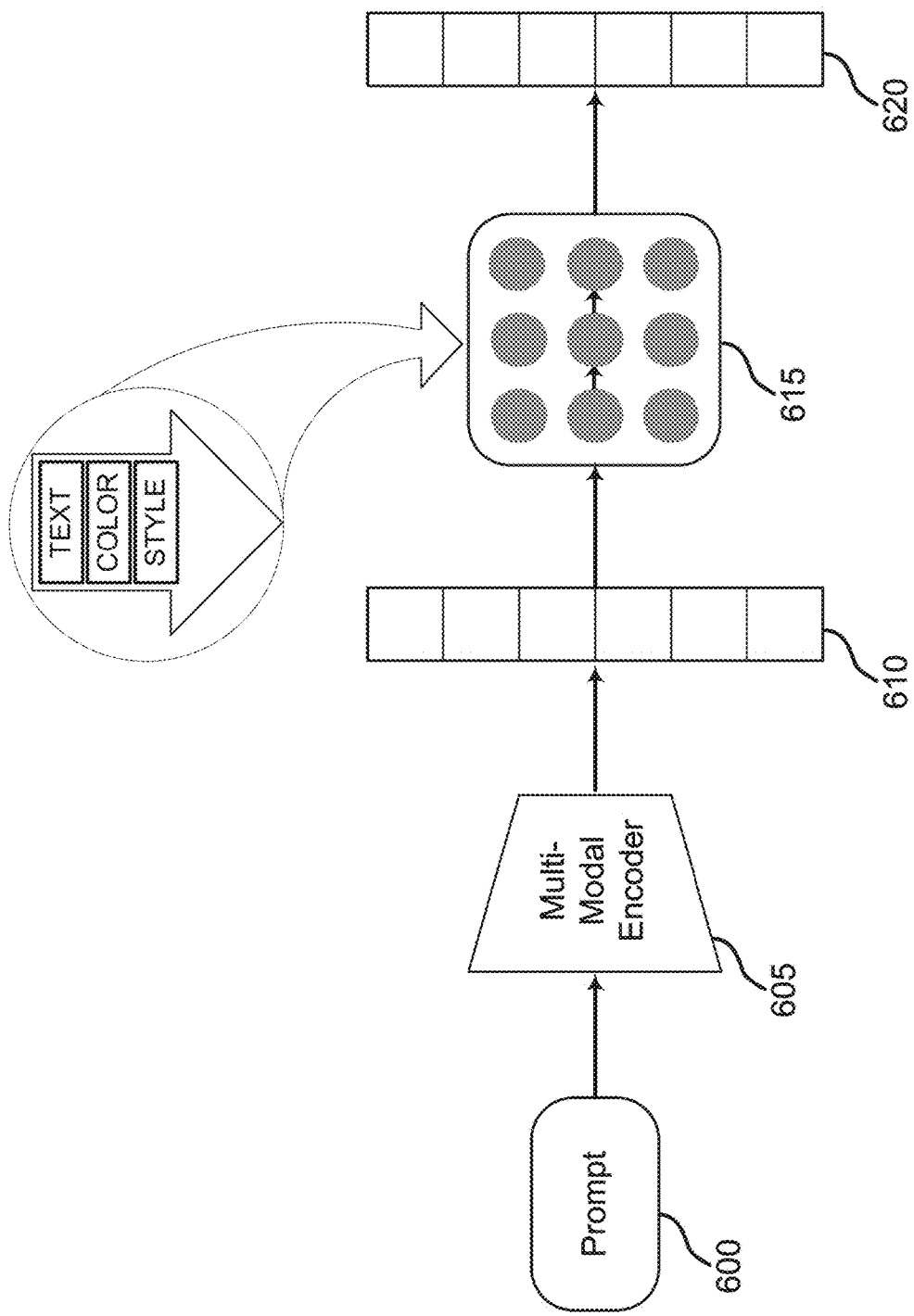
FIG. 6 shows an example of a diffusion prior model according to aspects of the present disclosure.

FIG. 6 shows an example of a diffusion prior model according to aspects of the present disclosure. The example shown includes prompt 600, multi-modal encoder 605, text embedding 610, diffusion prior model 615, and image embedding(s) 620.

According to some embodiments of the present disclosure, diffusion prior model 615 includes a diffusion-based mapping function that learns a target embedding when conditioned on a source embedding. For example, diffusion prior model 615 is conditioned by text embedding 610 to predict a corresponding image embedding 620. In some cases, the input conditioning is replaced or augmented by other types of embeddings. For example, other types of embeddings include but are not limited to color embeddings of the image, style embeddings of the image, tag embeddings, and sketch embeddings. These embeddings, with or without text embedding 610, are input to diffusion prior model 615 to predict a corresponding image embedding 620.

Multi-modal encoder 605 receives prompt 600 and generates text embedding 610. Diffusion prior model 615 converts text embedding 610 to image embedding 620. In some cases, diffusion prior model 615 generates a set of image embeddings based on text embedding 610. In an embodiment, diffusion prior model 615 scores and ranks the set of image embeddings by comparing each image embedding 620 to text embedding 610. Diffusion prior model 615 calculates a similarity score and selects a set of image embeddings with the highest similarity score, where a high similarity score represents image embedding 620 is similar to text embedding 610. Text embedding 610 and image embedding(s) 620 are in a multi-modal embedding space.

In an embodiment, diffusion prior model 615 receives different types of input prompts. For example, diffusion prior model 615 may receive a text prompt, where the text prompt includes a word, a short phrase, or a long sentence. Diffusion prior model 615 may receive a color prompt, where the color prompt includes a color palette. Diffusion prior model 615 may receive a style prompt, where the style prompt includes a combination of various image textures, colors, way of painting, writing, composing, characteristics of a particular period, place, person, or movement.

Multi-modal encoder 605 is an example of, or includes aspects of, the corresponding element described with reference to FIGS. 2, 5, and 17. Diffusion prior model 615 is an example of, or includes aspects of, the corresponding element described with reference to FIGS. 2, 5, and 17. Image embedding 620 is an example of, or includes aspect of, the corresponding element described with reference to FIG. 5.

Image Processing

In FIGS. 7-12, a method, apparatus, and non-transitory computer readable medium for image processing are described. One or more aspects of the method, apparatus, and non-transitory computer readable medium include obtaining a text prompt; encoding the text prompt to obtain a text embedding; converting the text embedding to an image embedding using a diffusion prior model; and generating an image based on the image embedding using a latent diffusion model, wherein the image includes an element described by the text prompt.

Some examples of the method, apparatus, and non-transitory computer readable medium further include generating a plurality of image embeddings based on the text embedding, wherein the image embedding is selected from the plurality of image embeddings. Some examples of the method, apparatus, and non-transitory computer readable medium further include generating a plurality of images based on the plurality of image embeddings, respectively, wherein each of the plurality of images includes the element described by the text prompt.

Some examples of the method, apparatus, and non-transitory computer readable medium further include comparing each of the plurality of image embeddings to the text embedding. Some examples further include computing a similarity score based on the comparison, wherein the image embedding is selected based on the similarity score. Some examples of the method, apparatus, and non-transitory computer readable medium further include generating a plurality of images based on the image embedding, wherein each of the plurality of images includes the element described by the text prompt.

Some examples of the method, apparatus, and non-transitory computer readable medium further include generating a plurality of noise maps, wherein each of the plurality of images is generated based on one of the plurality of noise maps. In some examples, the plurality of images has different aspect ratios. In some examples, the image embedding is in a same embedding space as the text embedding. Some examples of the method, apparatus, and non-transitory computer readable medium further include generating a modified image embedding using the LDM, wherein the image is generated based on the modified image embedding.

Some examples of the method, apparatus, and non-transitory computer readable medium further include obtaining an image prompt. Some examples further include encoding the image prompt to obtain an additional image embedding. Some examples further include generating an additional image based on the additional image embedding using the LDM, wherein the additional image includes an additional element of the image prompt.

Figure 7:
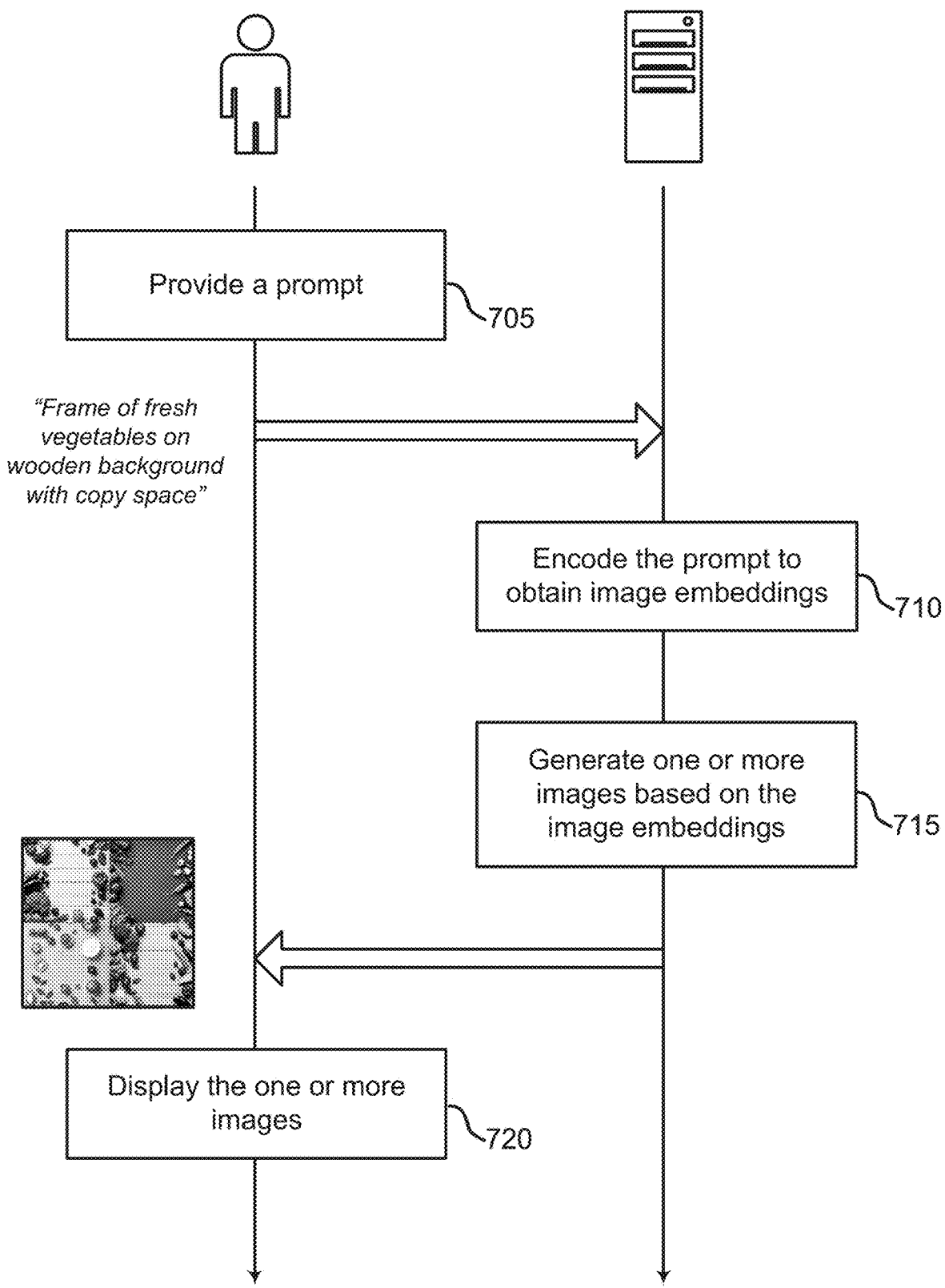
FIG. 7 shows an example of an image generation application according to aspects of the present disclosure.

FIG. 7 shows an example of an image generation application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the user provides a text prompt. In some cases, the operations of this step refer to, or may be performed by, a user as described with reference to FIG. 1. For example, a user provides the following text prompt, via a user interface including a text input element, to the image processing apparatus: "frame of fresh vegetables on wooden background with copy space." In some cases, the user may provide a color prompt, a style prompt, an image prompt, or a sketch prompt to the image processing apparatus.

At operation 710, the system encodes the text prompt to obtain image embeddings. In some cases, the operations of this step refer to, or may be performed by, an image processing apparatus as described with reference to FIGS. 1, 2, 9, and 10. In some cases, a multi-modal encoder encodes the text prompt to generate a multi-modal embedding, where the multi-modal embedding is a text embedding, color embedding, style embedding, and/or image embedding. A diffusion prior model coverts the multi-modal embedding to one or more image embeddings.

At operation 715, the system generates one or more images based on the image embeddings. In some cases, the operations of this step refer to, or may be performed by, an image processing apparatus as described with reference to FIGS. 1, 2, 9, and 10. For example, a latent diffusion model generates one or more images based on the one or more image embeddings, where the one or more image embeddings are different from each other. In some cases, the latent diffusion model adds noise to an image embedding to obtain a noised image embedding such that variations are injected to the generated images due to random noise.

At operation 720, the system displays the one or more images on a user interface. In some cases, the operations of this step refer to, or may be performed by, an image processing apparatus as described with reference to FIGS. 1, 2, 9, and 10. For example, the image processing apparatus displays a set of four different images to the user via a user interface implemented on a user device such as a mobile device or a desktop device (e.g., user device 105 described with reference to FIG. 1). In some cases, the image processing apparatus can be implemented on mobile devices or other electronic devices with limited storage and computation capacity.

Figure 8:
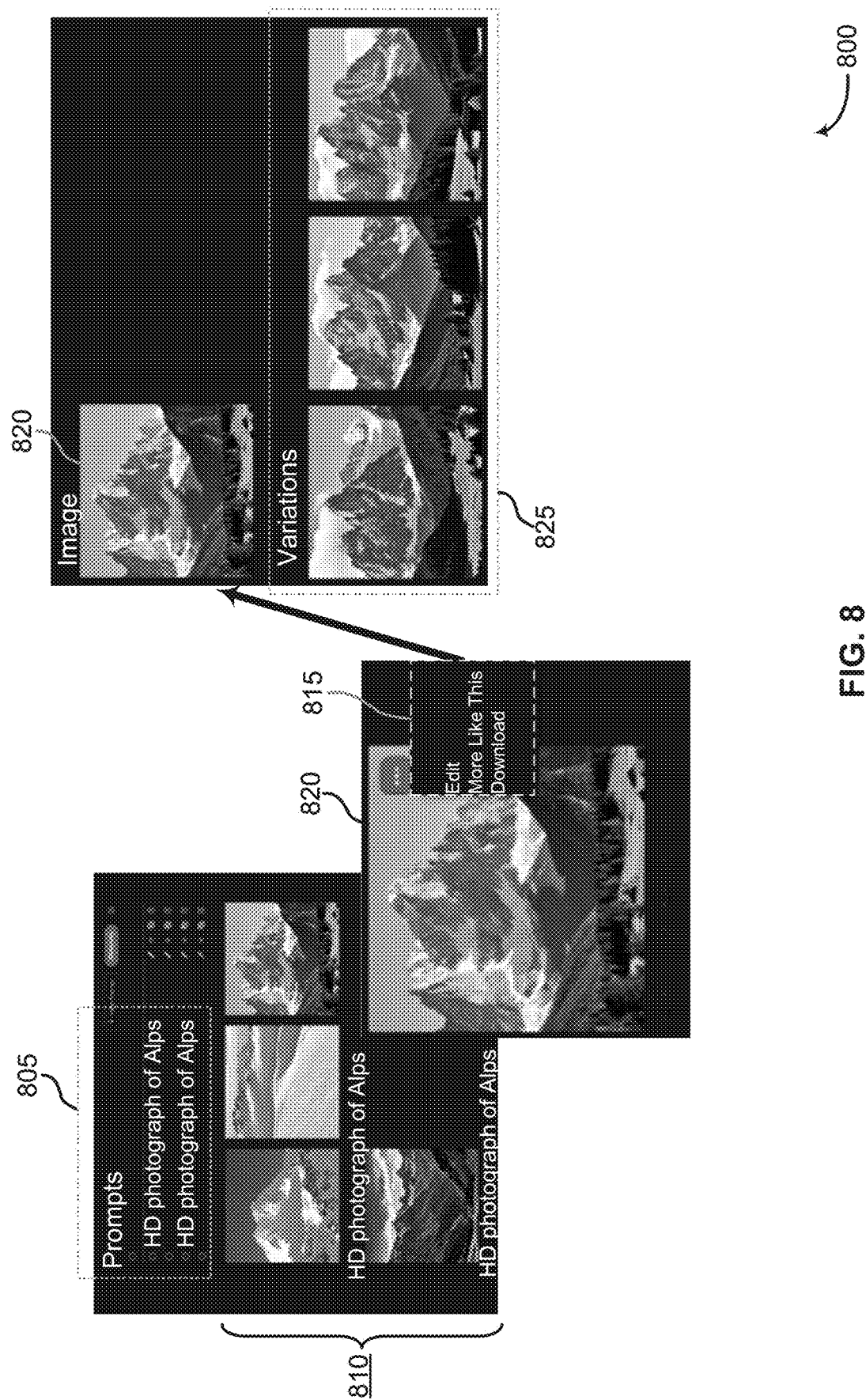
FIG. 8 shows an example of a user interface according to aspects of the present disclosure.

FIG. 8 shows an example of a user interface according to aspects of the present disclosure. The example shown includes user interface 800, text prompt 805, generated images 810, interface element 815, target image 820, and additional images 825.

Referring to FIG. 8, a user provides words, phrases, or sentences as text prompt 805 to user interface 800. For example, text prompt 805 states "HD photograph of Alps". In this example, text prompt 805 includes elements such as the quality of images to be generated (e.g., HD or high-definition), types of images to be generated (e.g., photograph), and object/class (e.g., Alps). The user can indicate the number of images to be generated. User interface 800 displays generated images 810, where generated images 810 include at least an element (e.g., class, object, and/or composition) of text prompt 805. As shown as an example in FIG. 8, generated images 810 show Alps from different angles, locations, etc. Generated images 810 have different features, colors, compositions, and styles.

User interface 800 is configured to generate image variations based on target image 820 of generated images 810. For example, a user selects target image 820 from generated images 810. User interface 800 displays interface element 815 that enables the user to select one of the listed commands. For example, interface element 815 enables editing and/or downloading target image 820. Additionally, by selecting "more like this" element in interface element 815, user interface 800 generates additional images 825 based on target image 820. Additional images 825 include one or more additional elements of target image 820 (may be referred as the image prompt). Additional images 825 are similar to target image 820 in terms of the structure, object relations, and/or style. For example, additional images 825 may include or depict a similar composition, class, color, style, foreground, or background of target image 820. Accordingly, the user can view multiple images of interest and these images are considered image variations (i.e., increased diversity of the results).

Text prompt 805 is an example of, or includes aspects of, the corresponding element described with reference to FIGS. 3, 5, and 9. Generated images 810 is an example of, or includes aspects of, the corresponding element described with reference to FIGS. 5 and 9. Additional images 825 is an example of, or includes aspects of, the corresponding element described with reference to FIG. 10.

Figure 9:
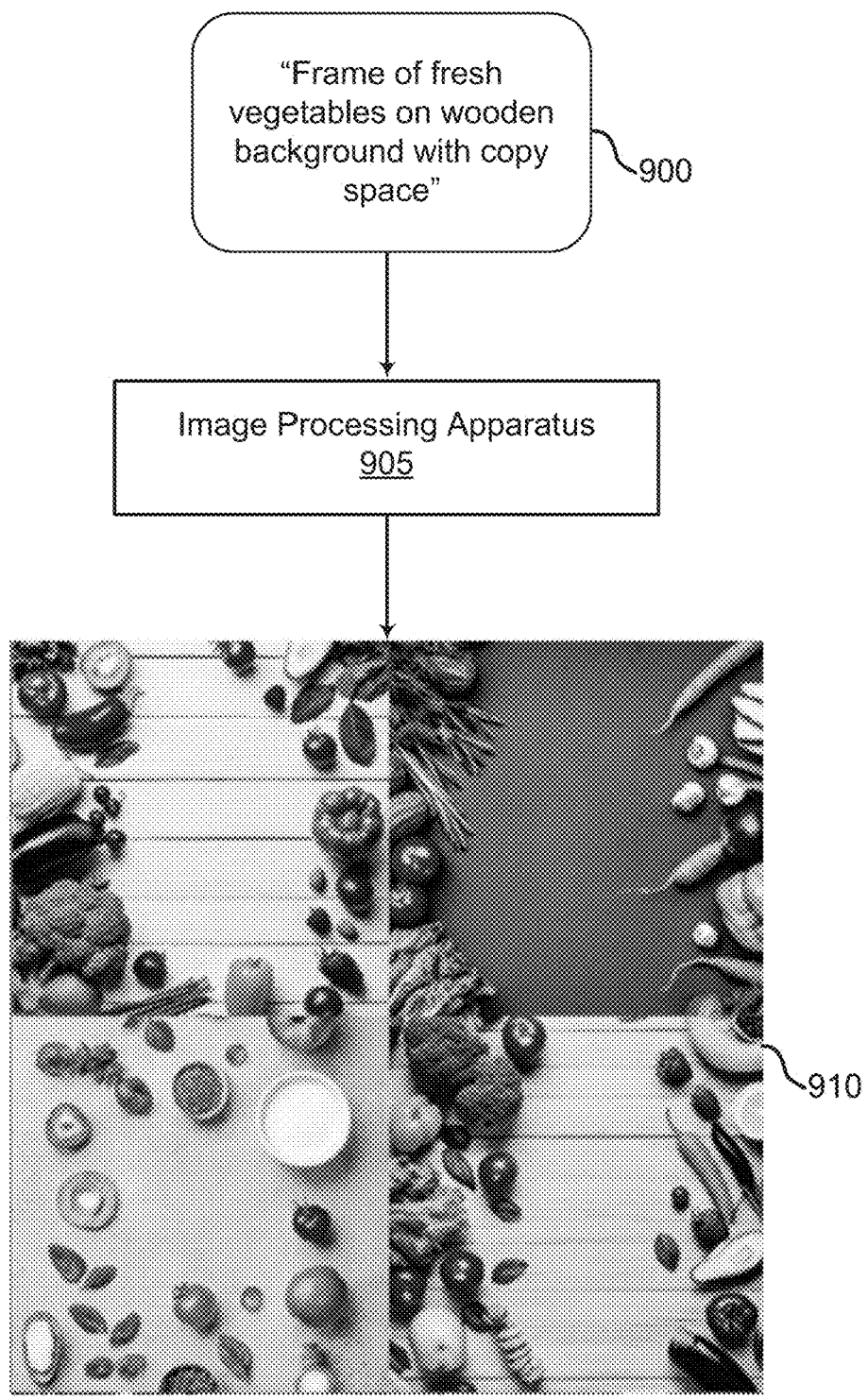
FIG. 9 shows an example of text to image generation according to aspects of the present disclosure.

FIG. 9 shows an example of text to image generation according to aspects of the present disclosure. The example shown includes text prompt 900, image processing apparatus 905, and generated image(s) 910.

Referring to FIG. 9, image processing apparatus 905 receives text prompt 900 and outputs a set of generated images (e.g., generated images 910) with different style, composition, etc. For example, text prompt 900 states "frame of fresh vegetables on wooden background with copy space." Image processing apparatus 905 takes text prompt 900 and generates one or more images including elements of text prompt 900. For example, the object/class of text prompt 900 may include "fresh vegetables", the background of text prompt 900 may include "wooden background", and the composition of text prompt 900 may include "copy space". Accordingly, generated images 910 include or depict an object/class, background, and/or a composition of text prompt 900. In some cases, generated images 910 have a high pixel dimension (e.g., dimension of 512×512 pixels). Further detail regarding generating images based on text prompt 900 is provided with reference to FIG. 11.

Text prompt 900 is an example of, or includes aspects of, the corresponding element described with reference to FIGS. 3, 5, and 8. Image processing apparatus 905 is an example of, or includes aspects of, the corresponding element described with reference to FIGS. 1, 2, and 10. Generated image(s) 910 is an example of, or includes aspects of, the corresponding element described with reference to FIGS. 5 and 8.

Figure 10:
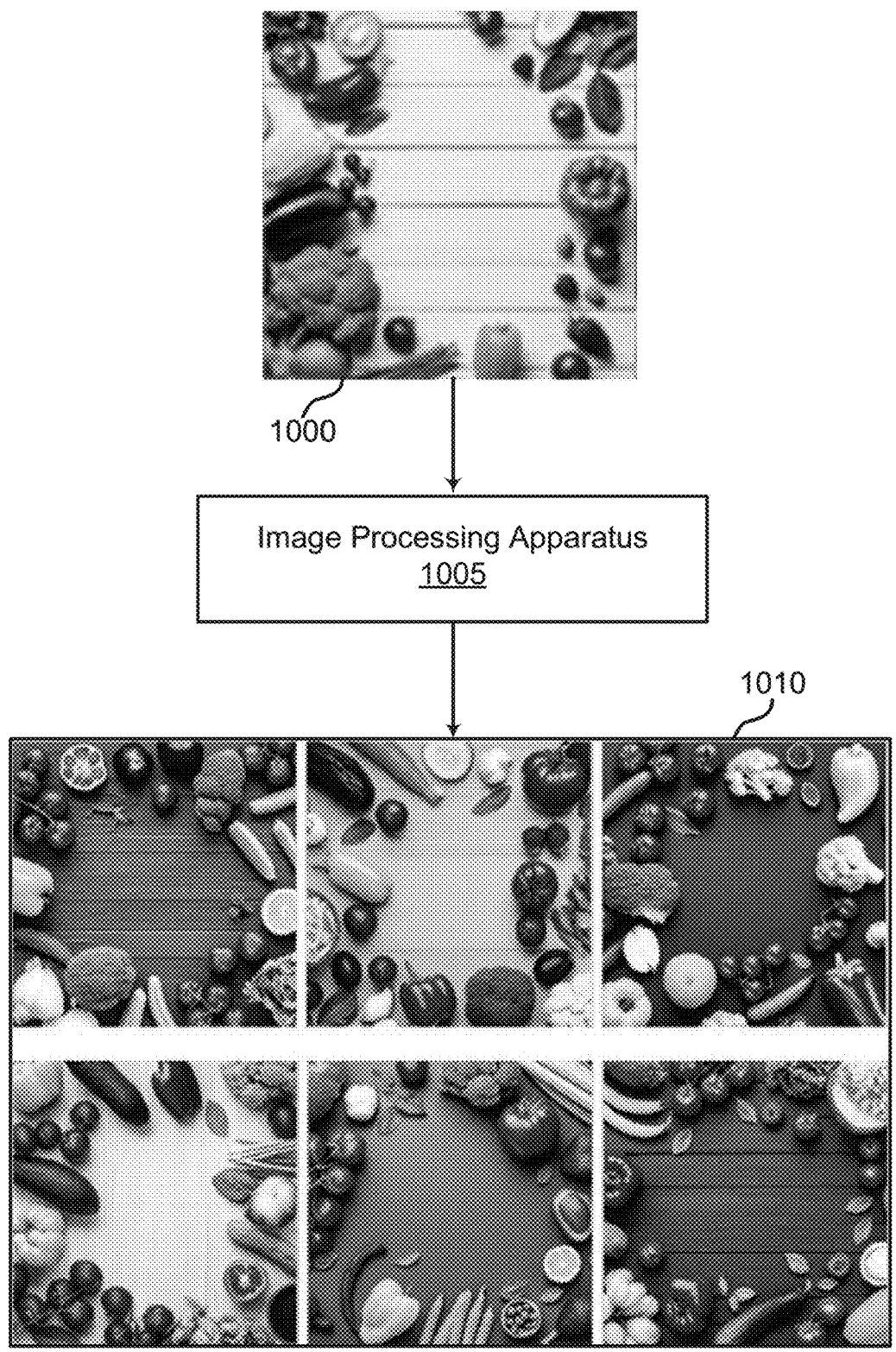
FIG. 10 shows an example of image to image variation generation according to aspects of the present disclosure.

FIG. 10 shows an example of image to image variation generation according to aspects of the present disclosure.

The example shown includes image prompt 1000, image processing apparatus 1005, and additional images 1010.

Referring to FIG. 10, image processing apparatus 1005 receives image prompt 1000 and outputs additional images 1010. For example, image prompt 1000 is an image of the generated images 910 from image processing apparatus 905 described with reference to FIG. 9. Additional images 1010 include one or more additional features of image prompt 1000. For example, additional images 1010 may include a composition similar to a composition of image prompt 1000. Additional images 1010 have a high pixel dimension (e.g., dimension of 512×512 pixels). Further detail regarding generating additional images 1010 based on image prompt 1000 is provided with reference to FIG. 12.

Image prompt 1000 is an example of, or includes aspects of, the corresponding element described with reference to FIG. 5. Image processing apparatus 1005 is an example of, or includes aspects of, the corresponding element described with reference to FIGS. 1, 2, and 9. Additional images 1010 is an example of, or includes aspects of, the corresponding element described with reference to FIG. 8.

Figure 11:
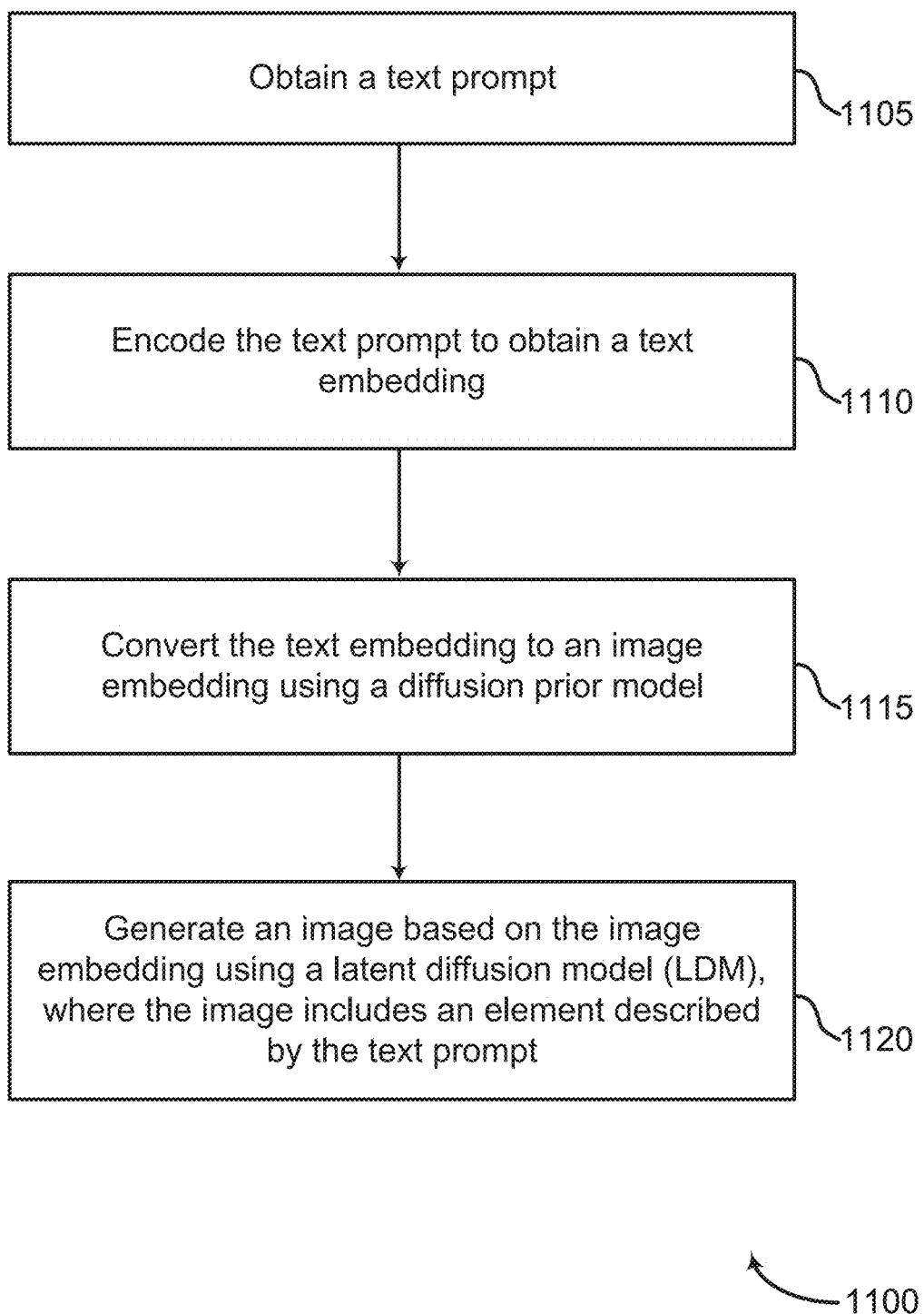
FIG. 11 shows an example of a method for image generation based on a text prompt according to aspects of the present disclosure.

FIG. 11 shows an example of a method 1100 for image generation based on a text prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system obtains a text prompt. In some cases, the operations of this step refer to, or may be performed by, a machine learning model as described with reference to FIG. 2. In some cases, the operations of this step refer to, or may be performed by, a user as described with reference to FIG. 1. For example, the image processing apparatus receives a text prompt for generating an image. In some cases, the text prompt is replaced by a multi-modal prompt such as a color prompt, a style prompt, image prompt, and/or a sketch prompt.

At operation 1110, the system encodes the text prompt to obtain a text embedding. In some cases, the operations of this step refer to, or may be performed by, a multi-modal encoder as described with reference to FIGS. 2, 5, 6, and 17. In an embodiment, the multi-modal encoder encodes the text prompt into a text embedding. In some cases, the multi-modal encoder encodes a multi-modal prompt to generate a multi-modal embedding.

At operation 1115, the system converts the text embedding to an image embedding using a diffusion prior model. In some cases, the operations of this step refer to, or may be performed by, a diffusion prior model as described with reference to FIGS. 2, 5, 6, and 17. For example, the text embedding and the image embedding are in the same embedding space (e.g., latent space). The diffusion prior model samples k different image embeddings and selects the image embedding that has a high similarity score with respect to the text embedding. In some cases, the diffusion prior model selects one or more image embeddings having high similarity scores by comparing candidate image embeddings and the text embedding. In some cases, the diffusion prior model is trained to predict image embeddings using latent-based image generation methods.

At operation 1120, the system generates an image based on the image embedding using a latent diffusion model, where the image includes an element described by the text prompt. In some cases, the operations of this step refer to, or may be performed by, a latent diffusion model as described with reference to FIGS. 2, 5, and 17. In some cases, the latent diffusion model generates a set of images based on a set of image embeddings. The set of images has different style-related features (e.g., composition, color, style, aspect ratio, or metadata) while keeping the semantics of the images constant. Latent diffusion model generates images with a high resolution e.g., a dimension of 512×512 pixels.

Figure 12:
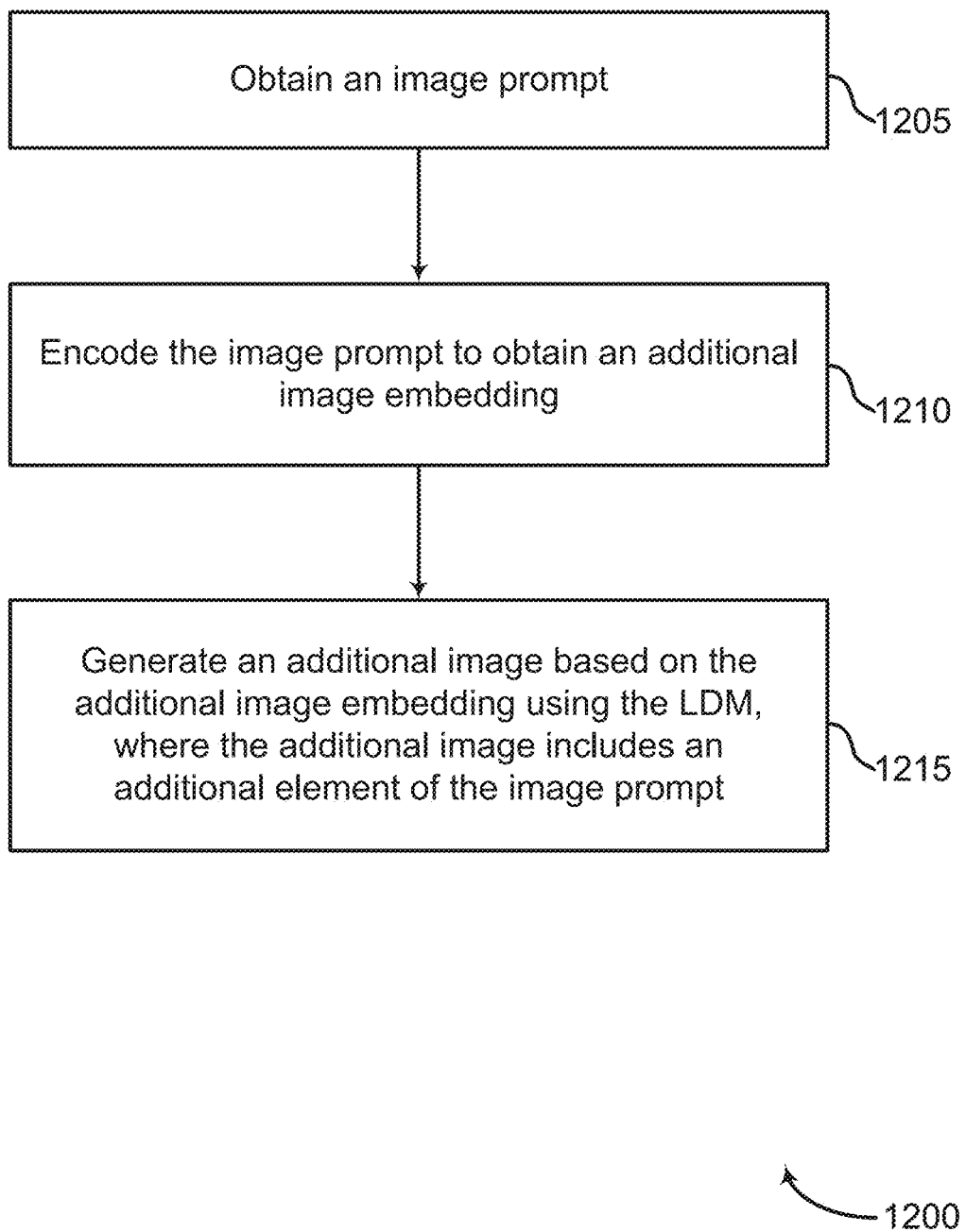
FIG. 12 shows an example of a method for image generation based on an image prompt according to aspects of the present disclosure.

FIG. 12 shows an example of a method 1200 for image generation based on an image prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system obtains an image prompt. In some cases, the operations of this step refer to, or may be performed by, a machine learning model as described with reference to FIG. 2. For example, the image prompt is an output image from the generated images (described with reference to FIGS. 9 and 11).

At operation 1210, the system encodes the image prompt to obtain an additional image embedding. In some cases, the operations of this step refer to, or may be performed by, a multi-modal encoder as described with reference to FIGS. 2, 5, 6, and 17. For example, the additional image embedding includes semantic information of the image prompt.

At operation 1215, the system generates an additional image based on the additional image embedding using the latent diffusion model, where the additional image includes an additional element of the image prompt. In some cases, the operations of this step refer to, or may be performed by, a latent diffusion model as described with reference to FIGS. 2, 5, and 17. According to some embodiments, the LDM conditions the image embedding with different noise values to generate different variations of the image. By introducing various noise values and the additional image embedding to the LDM, the LDM is able to generate additional images with semantic information that is substantially similar to that of the additional image embedding while making the additional images vary based on different noise values.

Training and Evaluation

In FIGS. 13-17, a method, apparatus, and non-transitory computer readable medium for image processing are described. One or more aspects of the method, apparatus, and non-transitory computer readable medium include obtaining training data including a training image; encoding the training image to obtain an image embedding using a multi-modal encoder; initializing a latent diffusion model; and training the LDM to generate an image based on the image embedding.

Some examples of the method, apparatus, and non-transitory computer readable medium further include adding noise to the image embedding to obtain a noise map. Some examples further include computing predicted noise based on the noise map. Some examples further include removing the predicted noise to obtain the image.

Some examples of the method, apparatus, and non-transitory computer readable medium further include obtaining additional training data including an additional image and a text describing the additional image. Some examples further include encoding the additional image and the text to obtain an additional image embedding and a text embedding respectively, using the multi-modal encoder. Some examples further include generating a predicted image embedding using a diffusion prior model based on the additional image embedding.

Some examples of the method, apparatus, and non-transitory computer readable medium further include adding a corresponding noise from a plurality of noise to the additional image embedding to obtain a plurality of additional noise image embeddings. Some examples further include generating a plurality of predicted image embeddings based on the plurality of additional noise image embeddings. Some examples further include comparing the plurality of predicted image embeddings to the text embedding. Some examples further include selecting the predicted image embedding from the plurality of predicted image embeddings based on the comparison. In some examples, the image embedding is based on the predicted image embedding.

Figure 13:
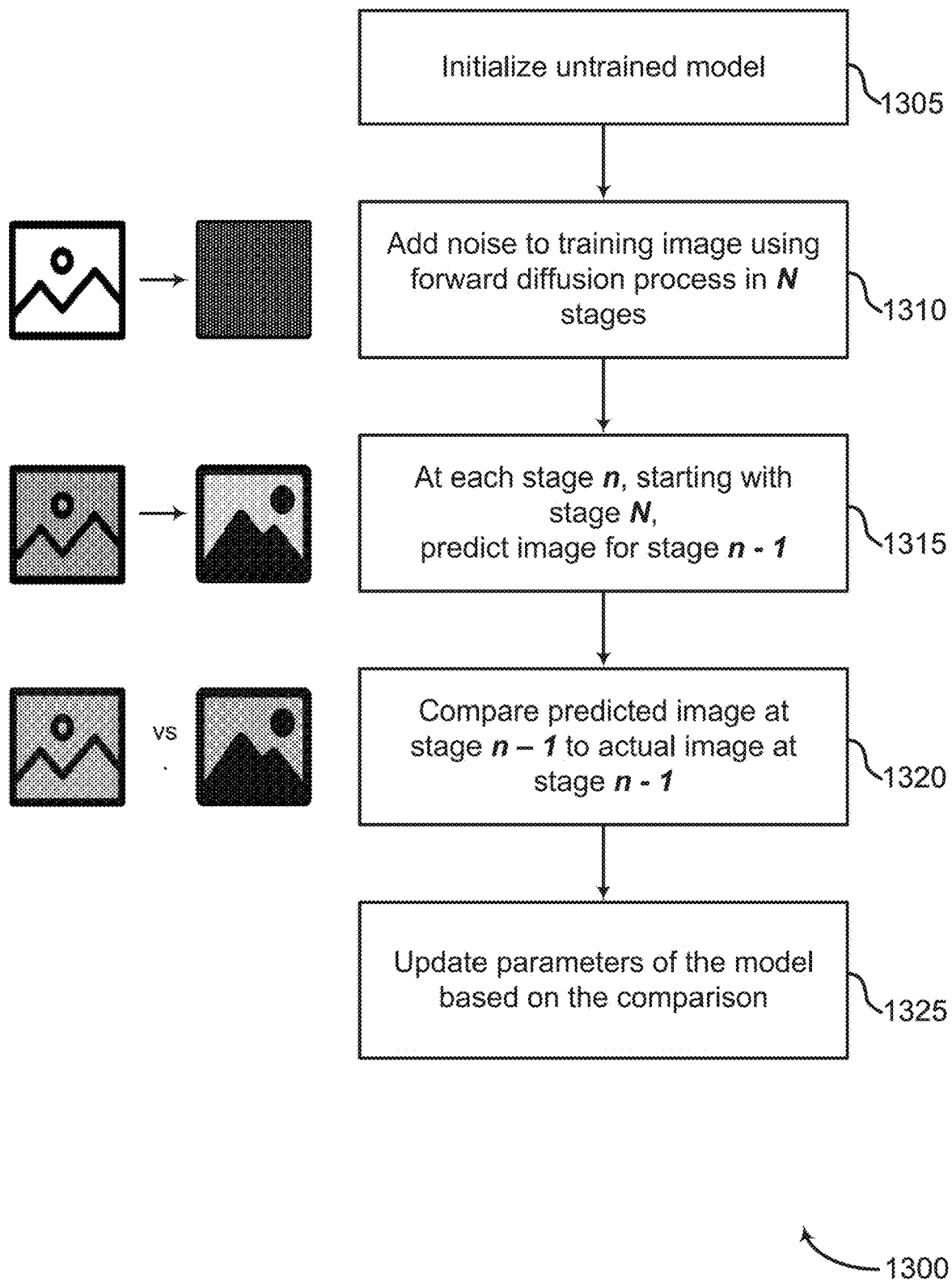
FIG. 13 shows an example of a method for training a diffusion model according to aspects of the present disclosure.

FIG. 13 shows an example of a method 1300 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system initializes an untrained model. In some cases, the operations of this step refer to, or may be performed by, a training component as described with reference to FIG. 2. Initialization can include defining the architecture of the model and establishing initial values for the model parameters. In some cases, the initialization can include defining hyper-parameters such as the number of layers, the resolution and channels of each layer block, the location of skip connections, etc.

At operation 1310, the system adds noise to a training image using a forward diffusion process in N stages. In some cases, the operations of this step refer to, or may be performed by, a training component as described with reference to FIG. 2. In some cases, the forward diffusion process is a fixed process where Gaussian noise is successively added to an image. In latent diffusion models, the Gaussian noise may be successively added to features in a latent space.

At operation 1315, the system at each stage n, starting with stage N, predict image (or image features) at stage n−1 using a reverse diffusion process. In some cases, the operations of this step refer to, or may be performed by, a training component as described with reference to FIG. 2. For example, the reverse diffusion process can predict the noise that was added by the forward diffusion process, and the predicted noise can be removed from the image to obtain the predicted image. In some cases, an original image is predicted at each stage of the training process. Detail regarding reverse diffusion is provided in detail with reference to FIG. 3.

At operation 1320, the system compares the predicted image (or image features) at stage n−1 to an actual image (or image features) at stage n−1. In some cases, the operations of this step refer to, or may be performed by, a training component as described with reference to FIG. 2. For example, given observed data x, the diffusion model may be trained to minimize the variational upper bound of the negative log-likelihood $-\log p_\theta(x)$ of the training data.

At operation 1325, the system updates parameters of the model based on the comparison. In some cases, the operations of this step refer to, or may be performed by, a training component as described with reference to FIG. 2. For example, parameters of a U-Net may be updated using gradient descent. Time-dependent parameters of the Gaussian transitions can also be learned.

Figure 14:
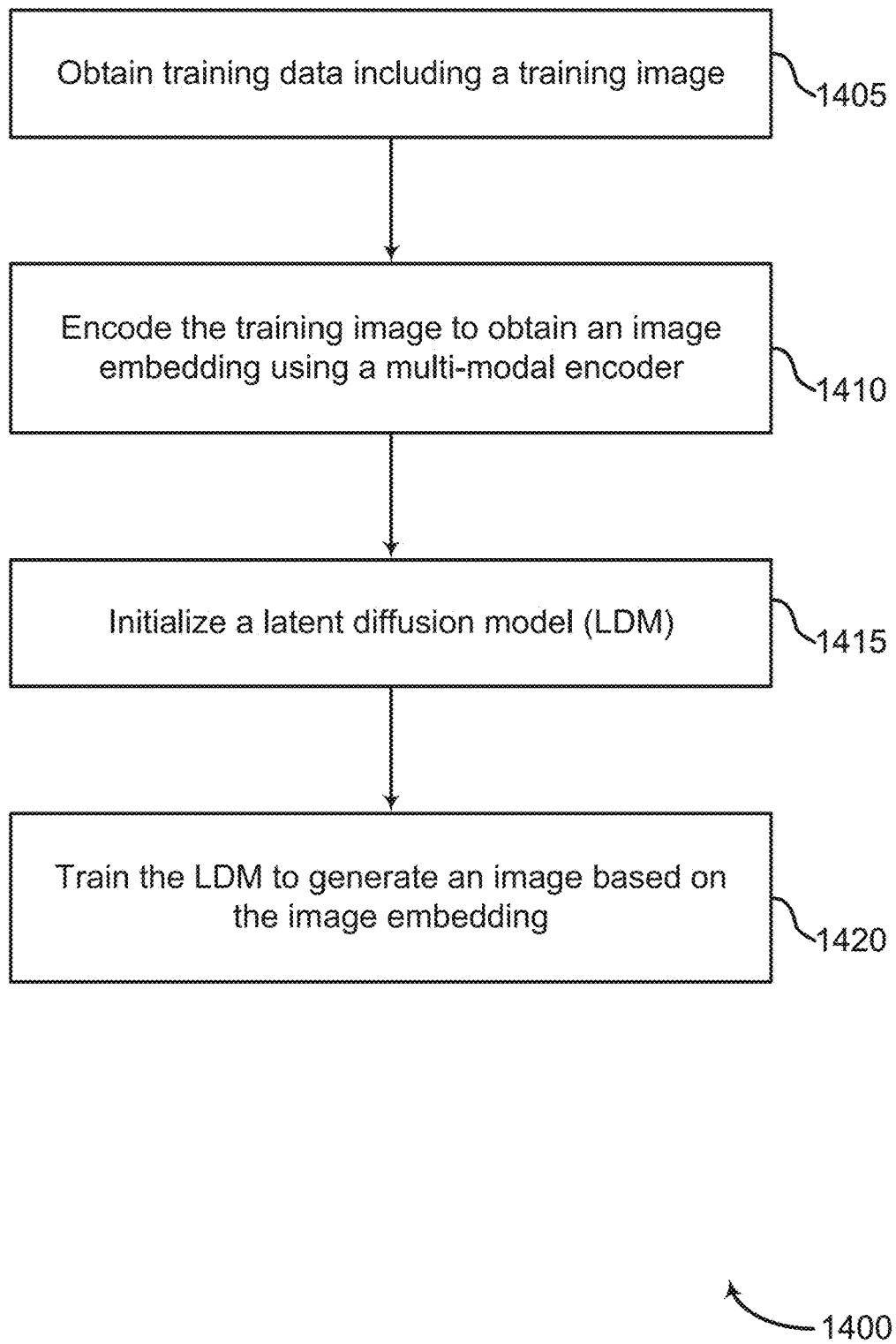
FIG. 14 shows an example of a method for training a machine learning model according to aspects of the present disclosure.

FIG. 14 shows an example of a method 1400 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system obtains training data including a training image. In some cases, the operations of this step refer to, or may be performed by, a training component as described with reference to FIG. 2. In some cases, the training data is stored in a database (described with reference to FIG. 1).

At operation 1410, the system encodes the training image to obtain an image embedding using a multi-modal encoder. In some cases, the operations of this step refer to, or may be performed by, a multi-modal encoder as described with reference to FIGS. 2, 5, 6, and 17. According to an embodiment, the multi-modal encoder is pretrained, where the multi-modal encoder is trained on millions of image caption pairs.

At operation 1415, the system initializes a latent diffusion model. In some cases, the operations of this step refer to, or may be performed by, a training component as described with reference to FIG. 2. Initialization relates to establishing initial values of the trainable parameters of the LDM. In some cases, the initialization can include defining hyper-parameters such as the number of layers, the resolution and channels of each layer block, the location of skip connections, etc.

At operation 1420, the system trains the LDM to generate an image based on the image embedding. In some cases, the operations of this step refer to, or may be performed by, a training component as described with reference to FIG. 2. In some cases, the training component trains the LDM based on a multi-modal image embedding, and the image processing apparatus generates variations of an image using the corresponding multi-modal image embedding.

Figure 15:
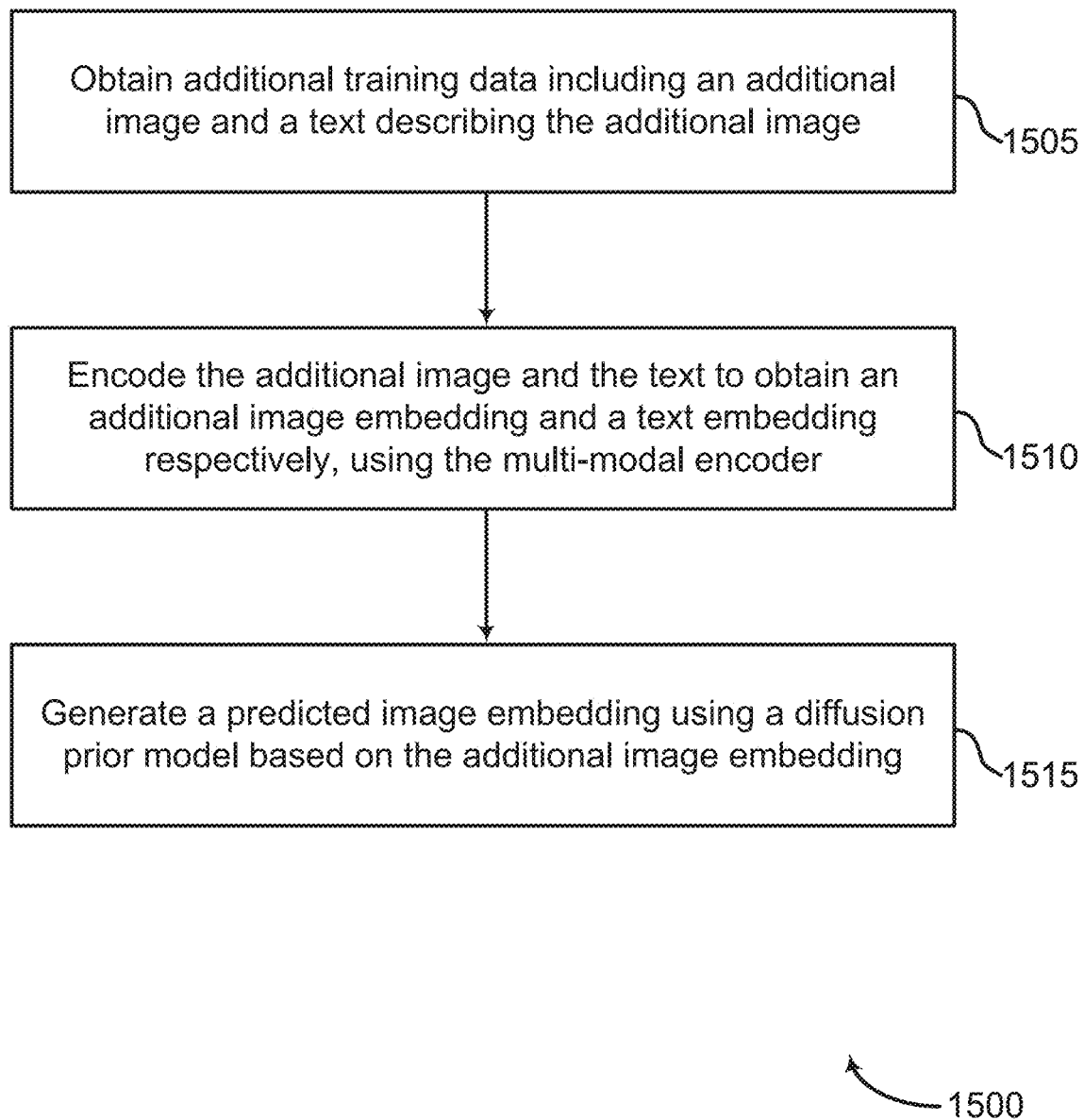
FIG. 15 shows an example of a method for training a diffusion prior model according to aspects of the present disclosure.

FIG. 15 shows an example of a method 1500 for training a diffusion prior model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system obtains additional training data including an additional image and a text describing the additional image. In some cases, the operations of this step refer to, or may be performed by, a training component as described with reference to FIG. 2. For example, the additional training data is stored in a database (described with reference to FIG. 1). The additional training data includes text-image pairs, where the text describes one or more elements (e.g., object/class, composition, color, style, and metadata) in the image.

At operation 1510, the system encodes the additional image and the text to obtain an additional image embedding and a text embedding respectively, using the multi-modal encoder. In some cases, the operations of this step refer to, or may be performed by, a multi-modal encoder as described with reference to FIGS. 2, 5, 6, and 17. According to an embodiment, the multi-modal encoder is pre-trained, where the multi-modal encoder is trained on millions of image caption pairs.

At operation 1515, the system generates a predicted image embedding using a diffusion prior model based on the additional image embedding. In some cases, the operations of this step refer to, or may be performed by, a diffusion prior model as described with reference to FIGS. 2, 5, 6, and 17. For example, the predicted image embedding and the additional image embedding includes similar semantic information of the additional image.

When training a diffusion prior model, a decoder-only Transformer is trained with a causal attention mask on a sequence including the text embedding, an embedding for the diffusion timestep, and a final embedding. The training component uses the output from the decoder-only Transformer to predict a de-noised image embedding. The training component further trains the diffusion prior model to predict the de-noised image embedding and calculates a loss using a mean-squared error (MSE) loss based on the prediction. In some cases, de-noised image embedding may also be referred to as an unnoised image embedding.

Figure 16:
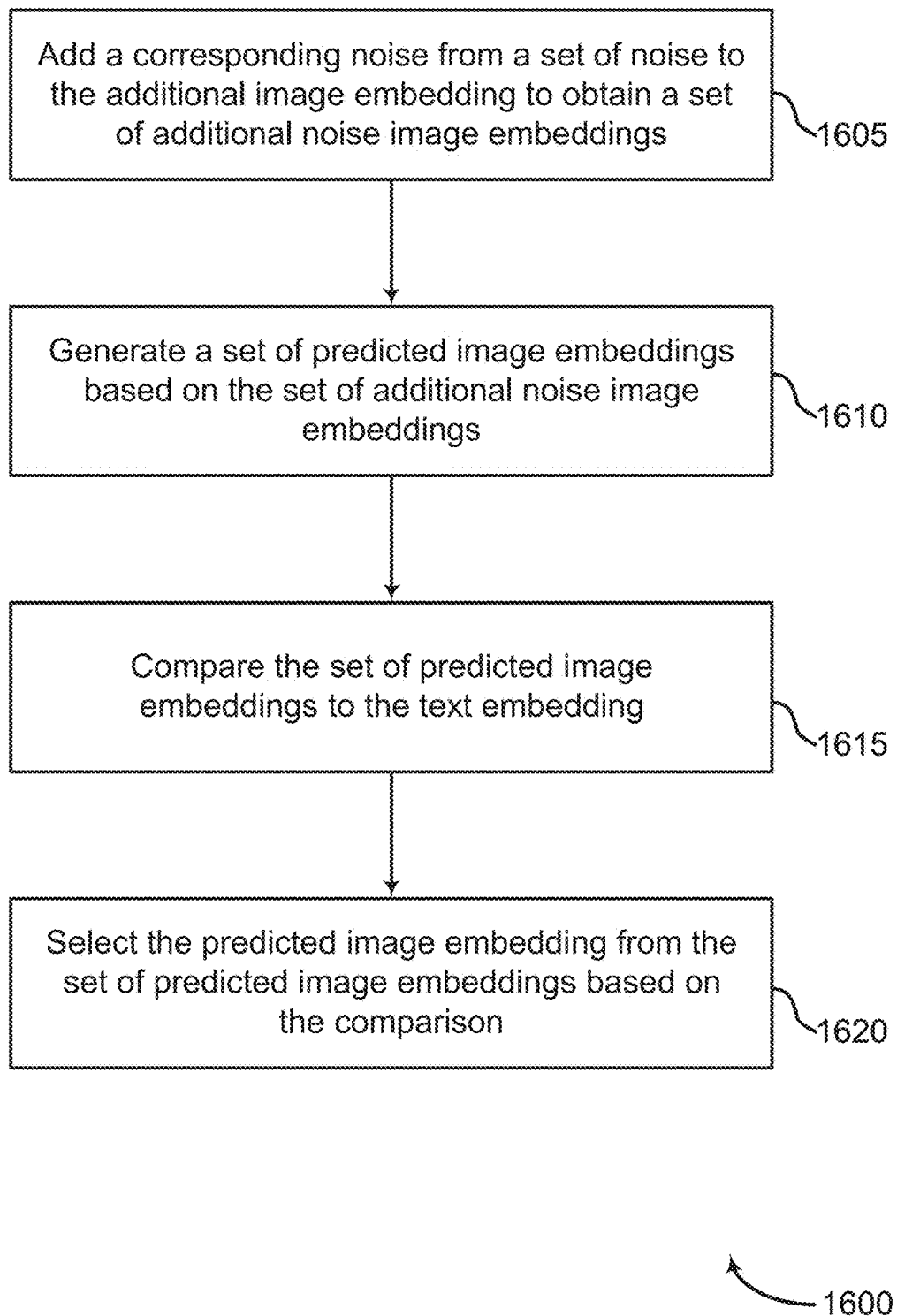
FIG. 16 shows an example of a method for training a machine learning model according to aspects of the present disclosure.

FIG. 16 shows an example of a method 1600 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system adds a corresponding noise from a set of noise to the additional image embedding to obtain a set of additional noise image embeddings. In some cases, the operations of this step refer to, or may be performed by, a latent diffusion model as described with reference to FIGS. 2, 5, and 17. In an embodiment, the set of additional noise image embeddings are input to the latent diffusion model to generate image variations. The set of noise may include random noise, fixed pattern noise, banding noise, or any combination thereof.

At operation 1610, the system generates a set of predicted image embeddings based on the set of additional noise image embeddings. In some cases, the operations of this step refer to, or may be performed by, a diffusion prior model as described with reference to FIGS. 2, 5, 6, and 17. For example, the set of predicted image embeddings and the set of additional image embeddings includes similar semantic information of the additional image.

In an embodiment, the diffusion prior model includes a diffusion-based mapping function which learns a target embedding when conditioned on a source embedding. At training, the training component conditions the diffusion prior model using a text embedding to predict a corresponding image embedding. The input conditioning may be replaced or augmented by other types of embedding, e.g., color embedding of the image, style embeddings of the image, tag embeddings along with the prompt text embedding to predict a corresponding image embedding.

At operation 1615, the system compares the set of predicted image embeddings to the text embedding. In some cases, the operations of this step refer to, or may be performed by, a training component as described with reference to FIG. 2. For example, the set of predicted image embeddings and the text embedding are in a same embedding space. The set of predicted image embeddings and the text embedding share similar semantic information.

In an embodiment, the training component trains a decoder-only Transformer with a causal attention mask on a sequence including the CLIP text embedding, an embedding for the diffusion timestep and a final embedding whose output from the Transformer is used to predict the unnoised (or denoised) CLIP image embedding. This is implemented using a Unet architecture. The diffusion prior model is trained to predict the unnoised (or denoised) image embedding and is based on using a mean-squared error loss on this prediction.

At operation 1620, the system selects the predicted image embedding from the set of predicted image embeddings based on the comparison. In some cases, the operations of this step refer to, or may be performed by, a training component as described with reference to FIG. 2. During inference time, the diffusion prior model samples k different image embeddings and picks the image embedding that has high similarity score with respect to the text embedding of the prompt. The predicted image embedding is further used to train a latent diffusion model.

At least one embodiment ranks the set of predicted image embeddings, where the predicted image embedding having a highest similarity score with respect to the text embedding is selected. In some cases, the highest similarity score is calculated by comparing the set of predicted image embeddings to the text embedding.

Figure 17:
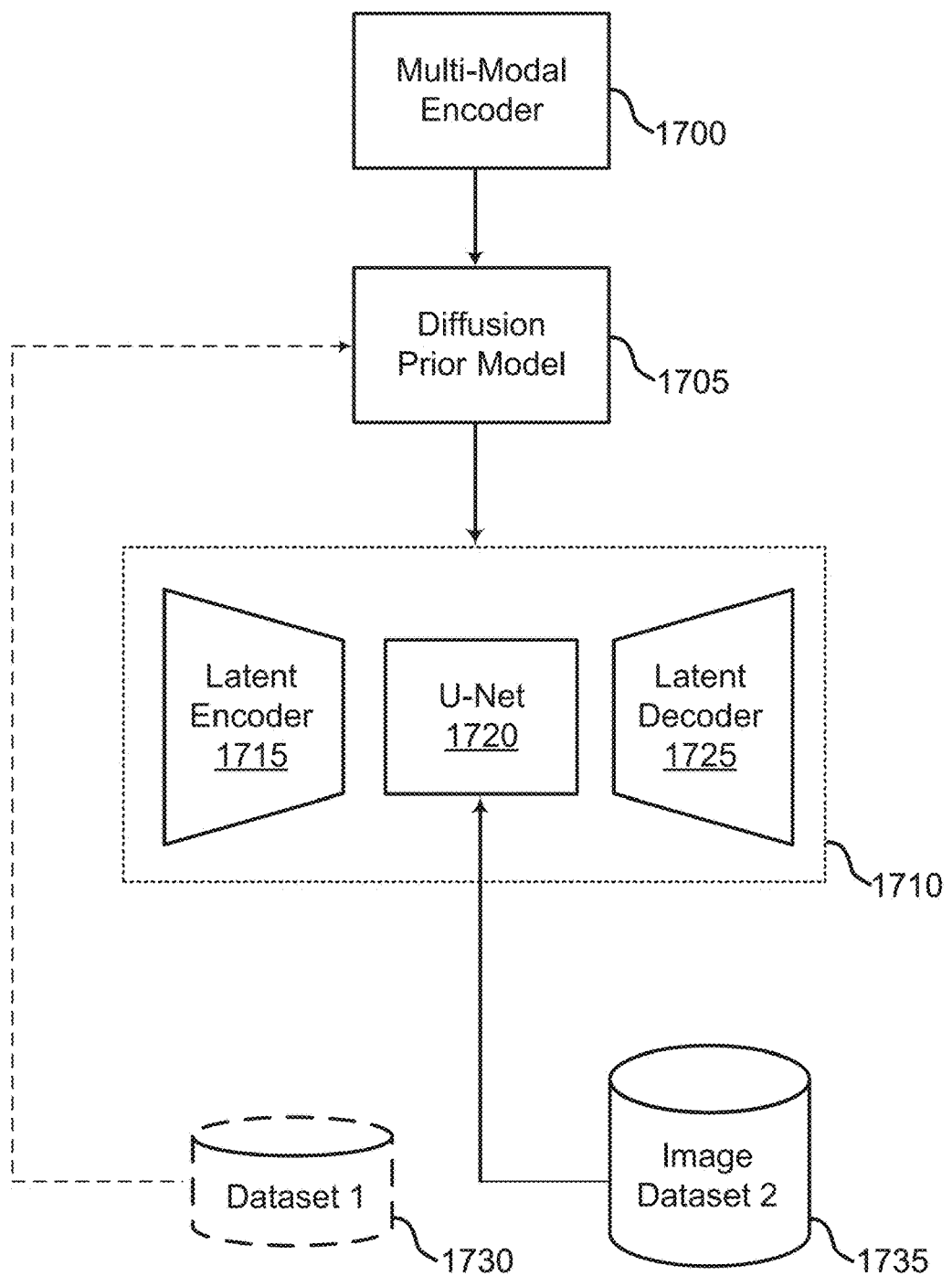
FIG. 17 shows an example of training a machine learning model according to aspects of the present disclosure.

Embodiments of the present disclosure includes a latent diffusion model, which trains diffusion-based image generation model in a latent space with a pre-trained auto encoder (e.g., latent encoder 1715 in FIG. 17). According to an aspect, the latent diffusion model is trained in a latent space. The latent diffusion model is primarily trained on class conditioned and text conditioning settings. According to some embodiments of the present disclosure, the training component combines the latent diffusion training scheme with Contrastive Language-Image Pre-Training (CLIP) image embedding based conditioning. CLIP-based image embedding has broader concept coverage because the CLIP model is trained on hundreds of millions of image-caption pairs. Since the training component trains the latent diffusion model based on CLIP image embedding, the image processing apparatus generates variations of images based on corresponding CLIP image embedding.

FIG. 17 shows an example of training a machine learning model according to aspects of the present disclosure. The example shown includes multi-modal encoder 1700, diffusion prior model 1705, latent diffusion model 1710, first dataset 1730, and second dataset 1735. Latent diffusion model 1710 includes latent encoder 1715, U-Net 1720, and latent decoder 1725.

FIG. 17 illustrates an example of training machine learning model 500 as shown in FIG. 5. The machine learning model includes multi-modal encoder 1700, diffusion prior model 1705, and latent diffusion model 1710. Details on multi-modal encoder 1700, diffusion prior model 1705, and latent diffusion model 1710 may be omitted. Multi-modal encoder 1700 is an example of, or includes aspects of, the corresponding element described with reference to FIGS. 2, 5, and 6. Diffusion prior model 1705 is an example of, or includes aspects of, the corresponding element described with reference to FIGS. 2, 5, and 6. Latent diffusion model 1710 is an example of, or includes aspects of, the corresponding element described with reference to FIGS. 2 and 5.

During training, two sets of datasets are used to train the machine learning model. For example, diffusion prior model 1705 is trained based on first dataset 1730. First dataset 1730 includes text-image pairs, where the text describes one or more elements (e.g., object/class, composition, color, style, metadata) in the image.

In an embodiment, latent diffusion model 1710 includes latent encoder 1715, U-Net 1720, and latent decoder 1725. Latent encoder 1715 is pre-trained. Latent decoder includes an image decoder. For example, latent diffusion model 1710 is trained based on second dataset 1735. In some examples, second dataset 1735 relates to latent diffusion training involving CLIP image embedding based conditioning. CLIP-based image embedding has broader concept coverage because the CLIP model is trained on hundreds of millions of image-caption pairs. U-Net 1720 is an example of, or includes aspects of, the corresponding element described with reference to FIG. 4.

Figure 18:
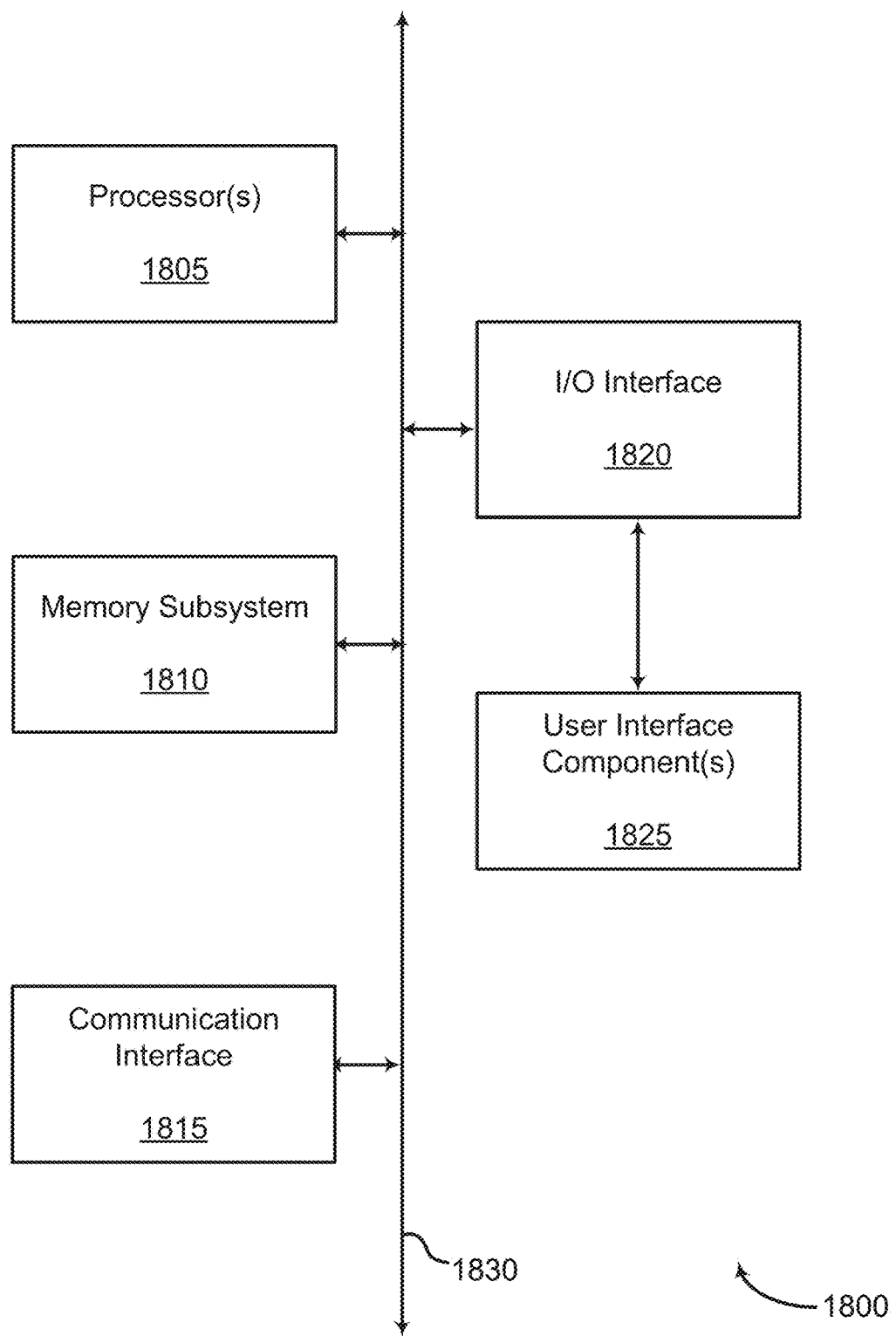
FIG. 18 shows an example of computing device according to aspects of the present disclosure.

FIG. 18 shows an example of computing device 1800 according to aspects of the present disclosure. The example shown includes computing device 1800, processor(s) 1805, memory subsystem 1810, communication interface 1815, I/O interface 1820, user interface component(s) 1825, and channel 1830.

In some embodiments, computing device 1800 is an example of, or includes aspects of, the image editing apparatus as described with reference to FIGS. 1-2, 9, and 10. In some embodiments, computing device 1800 includes one or more processors 1805 that can execute instructions stored in memory subsystem 1810 to obtain a text prompt; encode the text prompt to obtain a text embedding; convert the text embedding to an image embedding using a diffusion prior model; and generate an image based on the image embedding using a latent diffusion model, wherein the image includes an element described by the text prompt.

According to some aspects, computing device 1800 includes one or more processors 1805. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing. Processor(s) 1805 is an example of, or includes aspects of, the processor unit described with reference to FIG. 2.

According to some aspects, memory subsystem 1810 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1810 is an example of, or includes aspects of, the memory unit described with reference to FIG. 2.

According to some aspects, communication interface 1815 operates at a boundary between communicating entities (such as computing device 1800, one or more user devices, a cloud, and one or more databases) and channel 1830 and can record and process communications. In some cases, communication interface 1815 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1820 is controlled by an I/O controller to manage input and output signals for computing device 1800. In some cases, I/O interface 1820 manages peripherals not integrated into computing device 1800. In some cases, I/O interface 1820 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system(s). In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1820 or via hardware components controlled by the I/O controller.

According to some aspects, user interface component(s) 1825 enable a user to interact with computing device 1800. In some cases, user interface component(s) 1825 include an audio device, such as an external speaker system, an external display device such as a display screen, an input device (e.g., a remote-controlled device interfaced with a user interface directly or through the I/O controller), or a combination thereof. In some cases, user interface component(s) 1825 include a GUI.

Performance of apparatus, systems and methods of the present disclosure have been evaluated, and results indicate embodiments of the present disclosure have obtained increased performance over existing technology (if any). Example experiments demonstrate that the image processing apparatus outperforms conventional systems (if any).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a text prompt;
encoding the text prompt to obtain a text embedding;
converting the text embedding to an image embedding space using a diffusion prior model by performing diffusion based denoising to predict a denoised image embedding; and
generating an image based on the denoised image embedding using a latent diffusion model (LDM) different from the diffusion prior model, wherein the LDM receives input noise and the denoised image embedding as input and provides the image as output, and wherein the image includes an element described by the text prompt.

2. The method of claim 1, further comprising:
generating a plurality of image embeddings based on the text embedding, wherein the denoised image embedding is selected from the plurality of image embeddings.

3. The method of claim 2, further comprising:
generating a plurality of images based on the plurality of image embeddings, respectively, wherein each of the plurality of images includes the element described by the text prompt.

4. The method of claim 2, further comprising:
comparing each of the plurality of image embeddings to the text embedding; and
computing a similarity score based on the comparison, wherein the denoised image embedding is selected based on the similarity score.

5. The method of claim 1, further comprising:
generating a plurality of images based on the denoised image embedding, wherein each of the plurality of images includes the element described by the text prompt.

6. The method of claim 5, further comprising:
generating a plurality of noise maps, wherein each of the plurality of images is generated based on one of the plurality of noise maps.

7. The method of claim 5, wherein:
the plurality of images has different aspect ratios.

8. The method of claim 1, wherein:
the denoised image embedding is in a same embedding space as the text embedding.

9. The method of claim 1, further comprising:
generating a modified image embedding using the LDM, wherein the image is generated based on the modified image embedding.

10. The method of claim 1, further comprising:
obtaining an image prompt;
encoding the image prompt to obtain an additional image embedding; and
generating an additional image based on the additional image embedding using the LDM, wherein the additional image includes an additional element of the image prompt.

11. A method comprising:
obtaining training data including a text embedding;
predicting a denoised image embedding based on the text embedding;
computing a loss function based on the denoised image embedding; and
training a diffusion prior model based on the loss function, wherein a latent diffusion model (LDM) receives input noise and a denoised output from the diffusion prior model as input and provides an image as output.

12. The method of claim 11, further comprising:
encoding a training image to obtain an image embedding using a multi-modal encoder;
initializing the latent diffusion model (LDM); and
training the LDM to generate a synthetic image based on the image embedding.

13. The method of claim 12, further comprising:
obtaining additional training data including an additional image and a text describing the additional image;
encoding the additional image and the text to obtain an additional image embedding and the text embedding respectively, using the multi-modal encoder; and
generating a predicted image embedding using the diffusion prior model based on the additional image embedding.

14. The method of claim 13, further comprising:
adding a corresponding noise from a plurality of noise to the additional image embedding to obtain a plurality of additional noise image embeddings;
generating a plurality of predicted image embeddings based on the plurality of additional noise image embeddings;
comparing the plurality of predicted image embeddings to the text embedding; and
selecting the predicted image embedding from the plurality of predicted image embeddings based on the comparison.

15. The method of claim 13, wherein:
the image embedding is based on the predicted image embedding.

16. An apparatus comprising:
at least one processor; and
at least one memory including instructions executable by the at least one processor to perform operations including:

encoding, using a multi-modal encoder, a text prompt to obtain a text embedding;

converting, using a diffusion prior model, the text embedding to an image embedding space by performing diffusion based denoising to predict a denoised image embedding; and generating, using a latent diffusion model (LDM) different from the diffusion prior model, an image based on the denoised image embedding, wherein the LDM receives input noise and the denoised image embedding as input and provides the image as output, and wherein the image includes an element described by the text prompt.

17. The apparatus of claim 16, wherein:
the diffusion prior model comprises a transformer architecture.

18. The apparatus of claim 16, wherein:
the LDM comprises a U-Net architecture.

19. The apparatus of claim 16, wherein:
the LDM comprises an image decoder.

20. The apparatus of claim 16, further comprising:
a training component configured to train the LDM.

\* \* \* \* \*